(12) United States Patent
Daikoku et al.

(10) Patent No.: US 9,260,997 B2
(45) Date of Patent: Feb. 16, 2016

(54) EXHAUST DEVICE OF OUTBOARD MOTOR

(75) Inventors: Keisuke Daikoku, Shizuoka (JP);
Tetsushi Achiwa, Shizuoka (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 605 days.

(21) Appl. No.: 13/482,232

(22) Filed: May 29, 2012

(65) Prior Publication Data

US 2012/0304625 A1 Dec. 6, 2012

(30) Foreign Application Priority Data

May 30, 2011 (JP) .................................. 2011-120876
Jun. 9, 2011 (JP) .................................. 2011-129475

(51) Int. Cl.
*F01N 3/00* (2006.01)
*F01N 3/02* (2006.01)
*F01N 3/04* (2006.01)
*F01N 3/10* (2006.01)

(52) U.S. Cl.
CPC ................. *F01N 3/046* (2013.01); *F01N 3/101* (2013.01); *F01N 2560/025* (2013.01); *F01N 2590/021* (2013.01); *Y02T 10/22* (2013.01)

(58) Field of Classification Search
CPC ................... F01N 2560/025; F01N 2590/021; F01N 3/046; F01N 3/02; F02B 61/04; F02B 61/045
USPC .................................................... 60/276, 321
See application file for complete search history.

(56) References Cited

U.S. PATENT DOCUMENTS

| | | | |
|---|---|---|---|
| 4,759,181 A * | 7/1988 | Biritz | 60/321 |
| 5,078,631 A * | 1/1992 | Harbert | 440/89 R |
| 5,212,949 A | 5/1993 | Shiozawa | |
| 5,536,189 A | 7/1996 | Mineo | |
| 6,358,109 B1 | 3/2002 | Neisen | |
| 6,454,622 B2 * | 9/2002 | Mashiko et al. | 440/89 R |
| 6,746,290 B2 | 6/2004 | Nakata et al. | |
| 7,387,556 B1 | 6/2008 | Davis | |
| 7,390,232 B1 | 6/2008 | English et al. | |
| 7,628,663 B2 * | 12/2009 | McKinney | 440/89 C |
| 7,704,111 B2 | 4/2010 | Ito et al. | |
| 2001/0039908 A1 * | 11/2001 | Bilek et al. | 114/55.5 |
| 2002/0197921 A1 | 12/2002 | Nakata et al. | |
| 2005/0118901 A1 * | 6/2005 | Tateishi et al. | 440/88 R |

(Continued)

FOREIGN PATENT DOCUMENTS

| | | |
|---|---|---|
| JP | 7-144697 A | 6/1995 |
| JP | 2984027 B2 | 11/1999 |

(Continued)

*Primary Examiner* — Audrey K Bradley
*Assistant Examiner* — Jason Sheppard
(74) *Attorney, Agent, or Firm* — Troutman Sanders LLP

(57) ABSTRACT

A water jacket is attached to an exhaust manifold connected to an exhaust port to annularly cover an outer side of an exhaust channel in the exhaust manifold. An engine cooling coolant is made to flow as a cooling medium of the water jacket of the exhaust manifold. An exhaust pipe in a siphon shape is connected to the exhaust manifold, a water jacket is attached so as to annularly cover an outer side of a front half portion of the siphon shape, and seawater is directly supplied into the water jacket to flow therein. Consequently, an exhaust device of an outboard motor practically having a compact structure and excellent exhaust performance and accordingly realizing excellent engine performance is provided.

6 Claims, 20 Drawing Sheets

(56) References Cited

U.S. PATENT DOCUMENTS

| | | |
|---|---|---|
| 2008/0166935 A1 | 7/2008 | Ito et al. |
| 2009/0215341 A1* | 8/2009 | Ochiai ................ 440/88 C |
| 2010/0261393 A1* | 10/2010 | Kazuta ................ 440/89 E |

FOREIGN PATENT DOCUMENTS

| | | |
|---|---|---|
| JP | 2001-173443 A | 6/2001 |
| JP | 2003-3840 A | 1/2003 |
| JP | 2008-169707 A | 7/2008 |

* cited by examiner

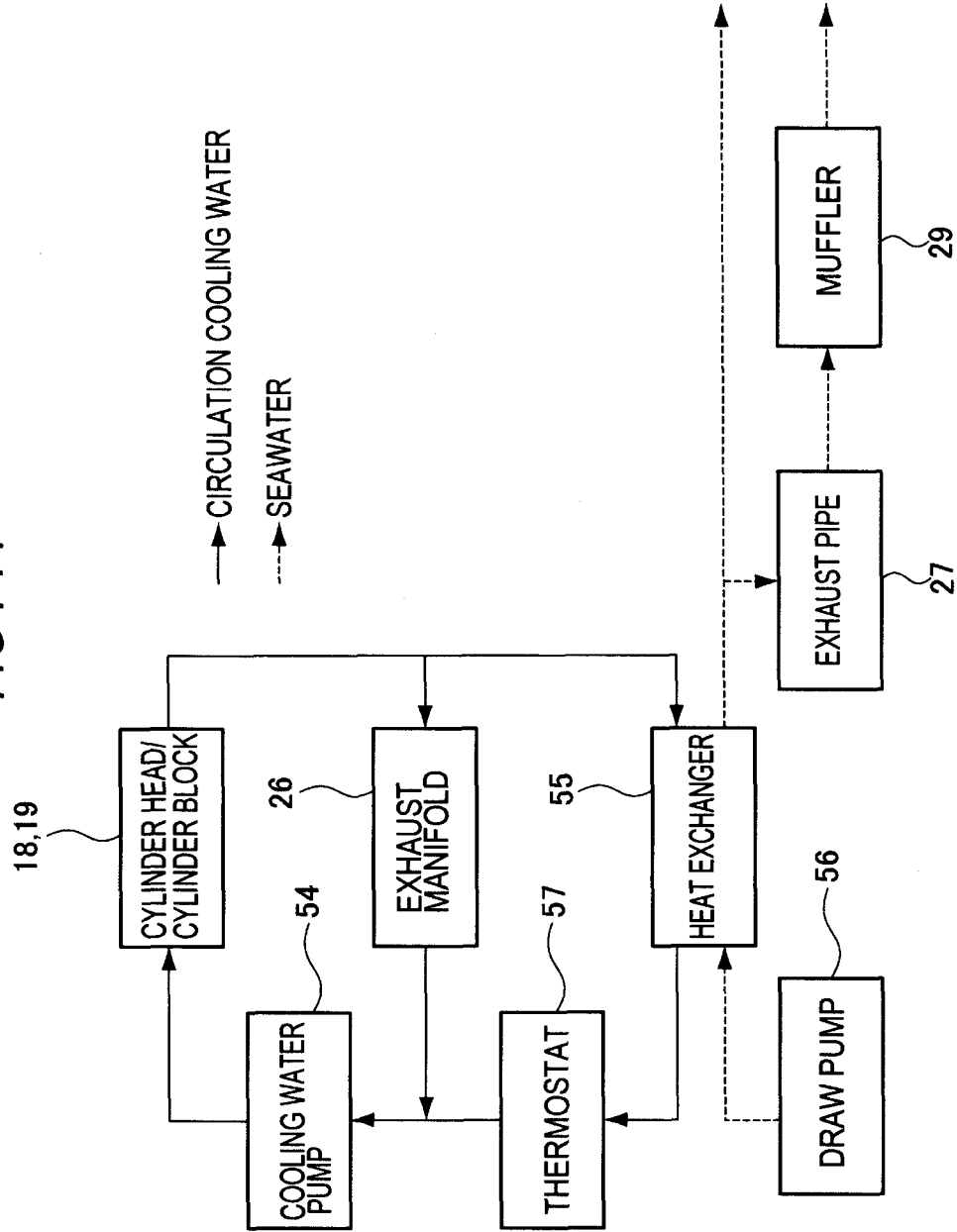

EXHAUST DEVICE OF OUTBOARD MOTOR

CROSS-REFERENCE TO RELATED APPLICATIONS

This application is based upon and claims the benefit of priority of the prior Japanese Patent Application No. 2011-120876, filed on May 30, 2011 and Japanese Patent Application No. 2011-129475, filed on Jun. 9, 2011, the entire contents of which are incorporated herein by reference.

BACKGROUND OF THE INVENTION

1. Field of the Invention

The present invention relates to an exhaust device for discharging combustion gas from an engine mounted on an outboard motor.

2. Description of the Related Art

Main types of propulsion engines and propulsion systems of ships or boats include outboard motors, inboard-outdrive motors, inboard motors, and the like. Among them, in the outboard motor, which is called an outboard drive or the like, an engine, its auxiliary machines, gears and shafts of a driving system, a screw, and so on are integrally structured. Generally, the outboard motor is mounted on a transom board of a stern of a hull. Typically, it is mounted on a small boat or the like and has a steering function and a tilting function.

In the inboard-outdrive motor, which is called an inboard engine-outboard drive or the like as an installation method of a propulsion engine of a small boat or the like, an engine is mounted on an inboard stern portion, and a drive unit integrally made up of reduction gears, a forward and reverse clutch, a Propeller, and so on is disposed on an outer portion of the transom board.

In any of these outboard motors, inboard-outdrive motors, and inboard motors, when an engine being an internal combustion engine is mounted as a power source, an intake device supplying air for combustion to the engine and an exhaust device discharging exhaust gas after the combustion are very important devices because they have a great influence on engine performance. A stricter restriction is imposed on these devices when they are used in the outboard motor or the like than when they are used on land, because of their usage environment and the like. In particular, as for the exhaust device, it is very important whether this device is effectively adaptable to the use under such a condition, and various contrivances have been conventionally made.

Concretely, there have been conventionally known exhaust devices and the like in outboard motors and the like of this type, such as those described in the undermentioned patent documents. As disclosed in these patent documents, these exhaust devices have merits and problems of their own.

Further, especially regarding a muffler of an exhaust device, Patent Document 4, for instance, describes an example of dry in-air exhaust of an inboard motor (inboard-out drive motor). The structure in this example is the same as that in an automobile engine, but a portion from a catalyst to the muffler is disposed inboard.

Further, Patent Document 5 describes an example of dry in-air exhaust in PWC (Personal. Water Craft). In this example, a muffler portion has a dual structure and is water-cooled.

Further, Patent Document 6 describes an example of dry underwater exhaust of an outboard motor. In this example, it is possible to realize a compact size and enhance silencing performance, but exhaust pressure becomes high. As a solution, exhaust gas is discharged into the air by a separate system during an idling operation.

Further, Patent Document 7 describes an example of dry underwater exhaust of a POD-type inboard motor. In this example, exhaust gas is not discharged during an idling operation.

[Patent Document 1] Japanese Laid-open Patent Publication No. 2008-169707
[Patent Document 2] Japanese Patent No. 2984027
[Patent Document 3] Specification of U.S. Pat. No. 7,390,232
[Patent Document 4] Japanese Laid-open Patent Publication No. 2001-173443
[Patent Document 5] Japanese Laid-open Patent Publication No, 07-144697
[Patent Document 6] Japanese Laid-open Patent Publication No. 2003-003840
[Patent Document 7] Specification of U.S. Pat. No. 7,387,556

An outboard motor with catalyst described in Patent Document 1 has a problem that a catalyst is likely to be splashed with surrounding seawater flowing back in an exhaust channel during reverse drive because the catalyst is located near an exhaust exit end (propeller). Another problem is a need to sharply bend the exhaust channel in order to stow the catalyst in a cover, which increases a loss of exhaust pressure and does not allow an increase in engine output performance.

Further, in the device described in Patent Document 2, since a catalyst is located more downstream than a top of an exhaust pipe (riser), exhaust temperature at the position of the catalyst lowers and purification efficiency worsens. In addition, there are problems that it is difficult to discharge water resulting from the condensation (liquefaction) of vapor in the exhaust gas since the catalyst is located at a substantially horizontal position, and moreover, the catalyst is likely to be splashed with surrounding seawater flowing back from an exhaust exit end during reverse drive or the like because the catalyst is near the exhaust exit end.

The structure described in Patent Document 3 does not have the problems of the backflow water/condensed water since a catalyst is far from an exhaust open end and is located in an exhaust gas upflow region or rising section. However, it has a problem that the temperature of the catalyst cannot be increased and accordingly purification efficiency cannot be enhanced because exhaust gas is assembled in an exhaust pipe at a position far from an engine exhaust port (outside the whole length of the engine) and thereafter is connected to a pipe in which the catalyst is provided.

Further, in the inboard-outdrive motor having a dry exhaust device described in Patent Document 4, it is necessary to provide a pipe around exhaust system components and cool them by air so that surface temperature of the exhaust system components is sufficiently lowered in order to prevent thermal damage to a hull and other components. This has a problem that the hull (engine room) requires a large space and an effective use volume of the hull reduces.

Further, in the example of the dry exhaust in the PWC of Patent Document 5, since the muffler has the dual-pipe structure and seawater is supplied between the pipes for the purpose of cooling, a space around the muffler is smaller than that in an air-cooling dry exhaust method, but there is a problem of an increase in weight.

Further, in some of the other examples, indirect (circulation) cooling is adopted for cooling an engine, and dry cooling with seawater or circulation liquid is adopted for cooling an exhaust manifold and an exhaust pipe. High temperature of exhaust gas immediately after it is discharged from the engine makes sealing of bonding surfaces difficult, and in this example, though a gas channel, and a cooling water channel are separated, this structure has a problem of further increasing the weight.

In another example, indirect circulation cooling is adopted for cooling an exhaust manifold and an exhaust pipe, and sealability of bonded portions are ensured by widening the channel, but this structure has a problem that purification efficiency cannot be enhanced because a catalyst is located at a position distant from an engine exhaust port.

In the above-described Patent Document 3, indirect cooling with circulation cooling liquid is adopted for a portion up to the position of toe catalyst in the exhaust gas upflow region and indirect cooling with seawater is adopted for cooling exhaust pipes thereafter. However, not only the engine but also the portions corresponding to the exhaust manifold and the exhaust pipe are also indirectly cooled with the circulation liquid, and the catalyst is located at a position distant from the engine exhaust port. Accordingly, a large portion is a target of the circulation cooling, which necessitates a large heat exchanger.

Further, regarding particularly a muffler of the exhaust device, in Patent Document 4, since the portion from the catalyst to the muffler is disposed inboard, a large amount of air is necessary to cool this portion, and in addition, a large space is necessary for heat insulation, which has a problem that inboard residence and loading space becomes small. Further, a long distance cannot be reserved between the engine and the muffler, resulting in difficulty in decreasing the exhaust temperature, moreover, poor silencing performance.

Further, in Patent Document 5, the muffler portion has the dual structure and is water-cooled, which has a problem of an increase in weight, though the space can be reduced.

Further, in Patent Document 6, the exhaust gas is discharge in the air by the separate system during the idling operation, but in the outboard motor, it is not possible to set an exit of the separate system sufficiently high above the water. Consequently, the exit often sinks under the water during reverse drive and when the draft is deep, which makes it difficult to ensure stable performance during the idling operation. Further, for the same reason, there is a problem that it is not possible to set the catalyst sufficiently higher than the draft line.

Further, in Patent Document 7, since the exhaust gas is not discharged during the idling operation, it is necessary to increase the idling rotation speed in order to ensure stable idling performance, which necessarily worsens fuel performance and silencing performance. Another problem is that tilting occurs when a collision takes place with an obstruction in water, and it is difficult to alleviate an impact force.

Further, in the example of the wet in-air exhaust of the outboard motor among the other examples, the structure is compact and the inboard residence and loading space is large compared with the dry in-air exhaust, but the wetting water is beaten due to exhaust pulsation during the idling (deceleration) operation, and silencing performance becomes low.

Further, in the other example of the wet underwater exhaust of the inboard-outdrive motor, though silencing performance is high and the structure is compact, bellows of a main exhaust channel bends in accordance with steering and tilting of a propulsion unit. Consequently, durability and reliability of the bellows are low and in the worst case, water might flow inboard from the bellows.

SUMMARY OF THE INVENTION

In view of the above-described circumstances, it is an object of the present invention no provide an exhaust device of an outboard motor having a practically compact structure and excellent exhaust performance, and as a result realizing excellent engine performance.

An exhaust device of an outboard motor of the present invention is an exhaust device to discharge combustion gas from an engine of an outboard motor which includes the engine housed in an engine case and a propulsion unit disposed on an outer portion of the engine case and driven by the engine, the exhaust device including a water jacket attached to an exhaust manifold connected to an exhaust port to annularly cover an outer side of an exhaust channel in the exhaust manifold.

In the exhaust device of the outboard motor of the present invention, the water jacket of the exhaust manifold has a fill port through which a cooling medium is fed from a lower end portion of the exhaust manifold and has an discharge port through which the cooling medium is discharged from an upper end portion of the exhaust manifold.

Further, in the exhaust device of the outboard motor of the present invention, as the cooling medium of the water jacket of the exhaust manifold, an engine cooling coolant is made to flow.

Further, in the exhaust device of the outboard motor of the present invention, an exhaust open end of the exhaust manifold is set to face upward.

Further, in the exhaust device of the outboard motor of the present invention, an exhaust pipe in a siphon shape is connected to the exhaust manifold, a water jacket is attached to annularly cover an outer side of a front half portion of the siphon shape, and seawater is directly supplied into the water jacket to be made to flow in the water jacket.

Further, in the exhaust device of the outboard motor of the present invention, the seawater is discharged into an exhaust channel in a rear half portion of the siphon shape of the exhaust pipe.

Further, in the exhaust device of the outboard motor of the present invention, the seawater is once led out to an upper outside via a pipe from an uppermost portion of the water jacket corresponding to a top portion of the siphon shape of the exhaust pipe, and the seawater is led into an injection nozzle mounted on the exhaust channel of the exhaust pipe.

Further, in the exhaust device of the outboard motor of the present invention, the injection nozzle is mounted immediately after the top portion of the siphon shape and is directed in a downstream direction of the exhaust channel of the exhaust pipe.

Further, in the exhaust device of the outboard motor of the present invention, an oxygen sensor or an air-fuel ratio sensor is disposed in the front half portion of the siphon shape of the exhaust pipe.

Further, in the exhaust device of the outboard motor of the present invention, sacrifice metal is disposed in the water jacket of the exhaust pipe.

Further, in the exhaust device of the outboard motor of the present invention, a catalyst is disposed between the oxygen sensor or the air-fuel ratio sensor and the injection nozzle.

Further, in the exhaust device of the outboard motor of the present invention, a cylindrical partition wall is provided in part of the engine case, an upper end of the partition wall is set near an upper end of the engine case, and a lower end of the partition wall is coupled to a muffler chamber, an upper end of an exhaust hose is coupled to an exit of an exhaust pipe and a lower end of the exhaust hose is coupled to a muffler, and the exhaust hose is laid from the engine case to the muffler chamber through the partition wall.

Further, in the exhaust device of the outboard motor of the present invention, side surfaces of the partition wall are partly formed by the engine case.

Further, in the exhaust device of the outboard motor of the present invention, water is injected into the exhaust pipe from an injection nozzle disposed more downstream than a top of the exhaust pipe to make the exhaust hose and the muffler a wet type.

Further, in the exhaust device of the outboard motor of the present invention, the exhaust hose and the muffler are made of rubber.

Further, in the exhaust device of the outboard motor of the present invention, an open end of the muffler is set higher than a ship bottom and lower than the engine.

Further, in the exhaust device of the outboard motor of the present invention, a check valve is disposed in the muffler.

Further, in the exhaust device of the outboard motor of the present invention, the muffler is horizontally disposed, a lower surface of the engine case is formed in an indented shape along a shape of the muffler, and the muffler is housed in the indented portion, and the muffler is sandwiched between the lower surface of the engine case and a muffler cover to be fixed.

Further, in the exhaust device of the outboard motor of the present invention, the open end of the muffler is disposed close to a lower end of a rear surface of the engine case and apart from a center portion of the engine case.

Further, in the exhaust device of the outboard motor of the present invention, when a rotation speed of the engine is low and an exhaust pressure of the engine is low, exhaust gas is discharged via an exhaust release system.

Further, in the exhaust device of the outboard motor of the present invention, an exhaust takeout port of the exhaust release system is provided in a rear half portion of the exhaust pipe.

Further, in the exhaust device of the outboard motor of the present invention, an open end of the exhaust release system is provided to extend downward from an upper surface of a center indented portion of the engine case.

BRIEF DESCRIPTION OF THE DRAWINGS

FIG. 14 is a block diagram schematically showing a cooling system including circulation channels for cooling water and so on in the exhaust device of the outboard motor of the present invention.

DETAILED DESCRIPTION OF THE PREFERRED EMBODIMENTS

Hereinafter, a suitable embodiment of an exhaust device of an outboard motor in the present invention will be described with reference to the drawings.

Figure 1:
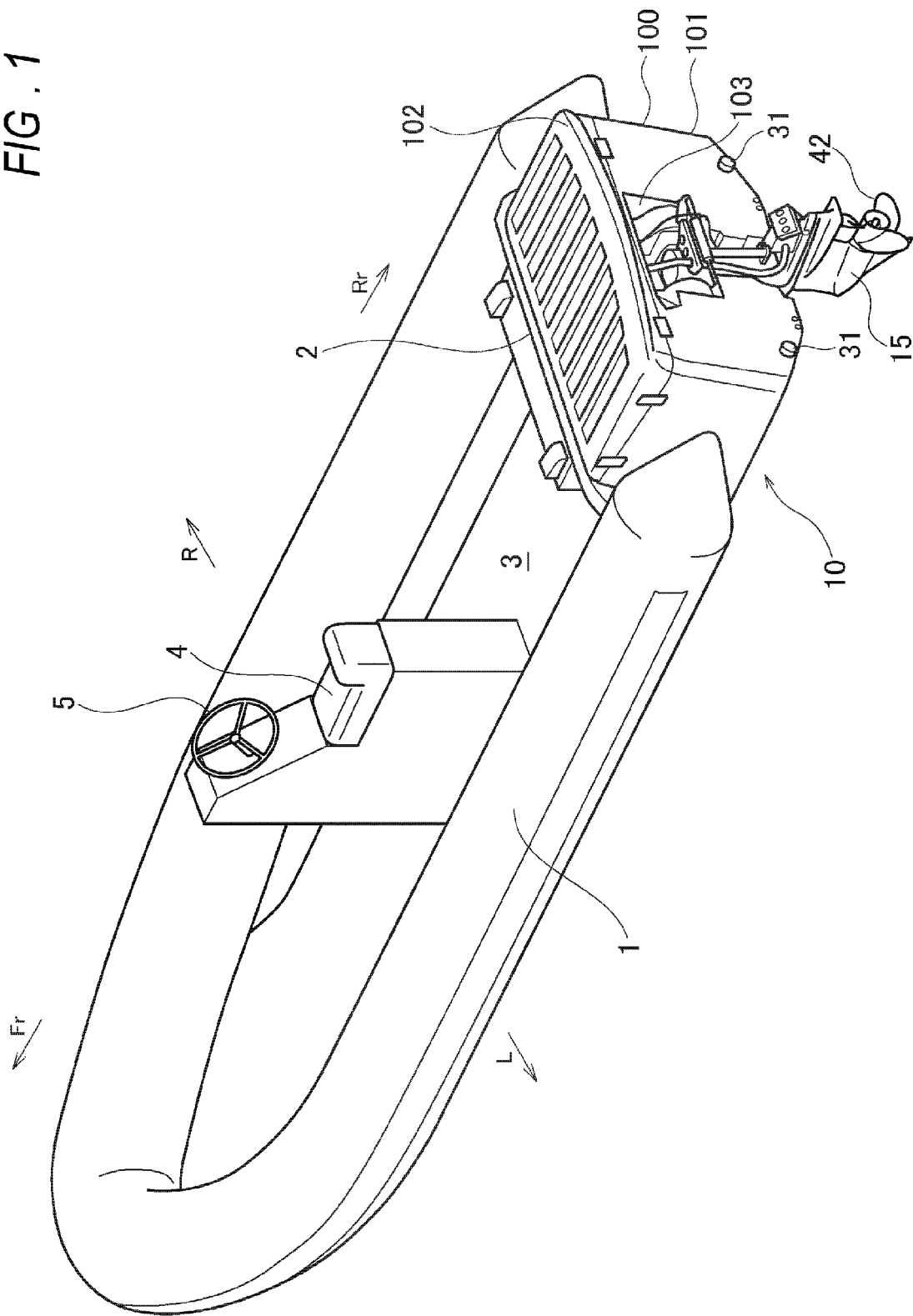
FIG. 1 is a perspective view showing an example of a ship or a boat on which an outboard motor according to the present invention is mounted.

FIG. 1 shows an example of a ship or a boat on which an outboard motor 10 according to the present invention is mounted. In this example, the ship is typically a medium-sized or small-sized type, and it has a transom board 2 (stern board) in a rear portion of a hull 1. As illustrated, the transom board 2 is used to mount the outboard motor 10. Note that, when necessary, in the drawings which will be hereinafter referred to, a forward direction (bow side) is shown by an arrow Fr and a backward direction (stern side) is shown by an arrow Rr. Further, left and right directions (beam direction) are shown by an arrow L and an arrow R when necessary.

Here, in the hull 1 according to this embodiment, a boat's floorboard 3 is laid on a bottom of the hull 1 and the transom board 2 is disposed on a rear end of the boat's floorboard 3 as shown in FIG. 1. A steering seat 4 is provided near a center portion of the boat's floorboard 3, and devices, machines, gauges, and so on necessary for steering such as a steering wheel 5 are provided on the steering seat 4. The outboard motor 10 is integrally equipped with power sources, a propulsion unit, a wheel turning device, a tilting device, and so on and is structured as a so-called all-in-one type, and it can be driven if common fixtures such as a fuel tank and a battery are provided in the hull 1 side.

It should be noted that the ship is not limited to the one shown in the illustrated example, and in some other example, a hull includes a bracket for mounting an outboard motor and so forth on a rear side of the transom board. That is, the outboard motor 10 of the present invention is effectively applicable to a type in which a stern board or a portion or a member corresponding to the stern board is provided on a stern of a bull.

Figure 2:
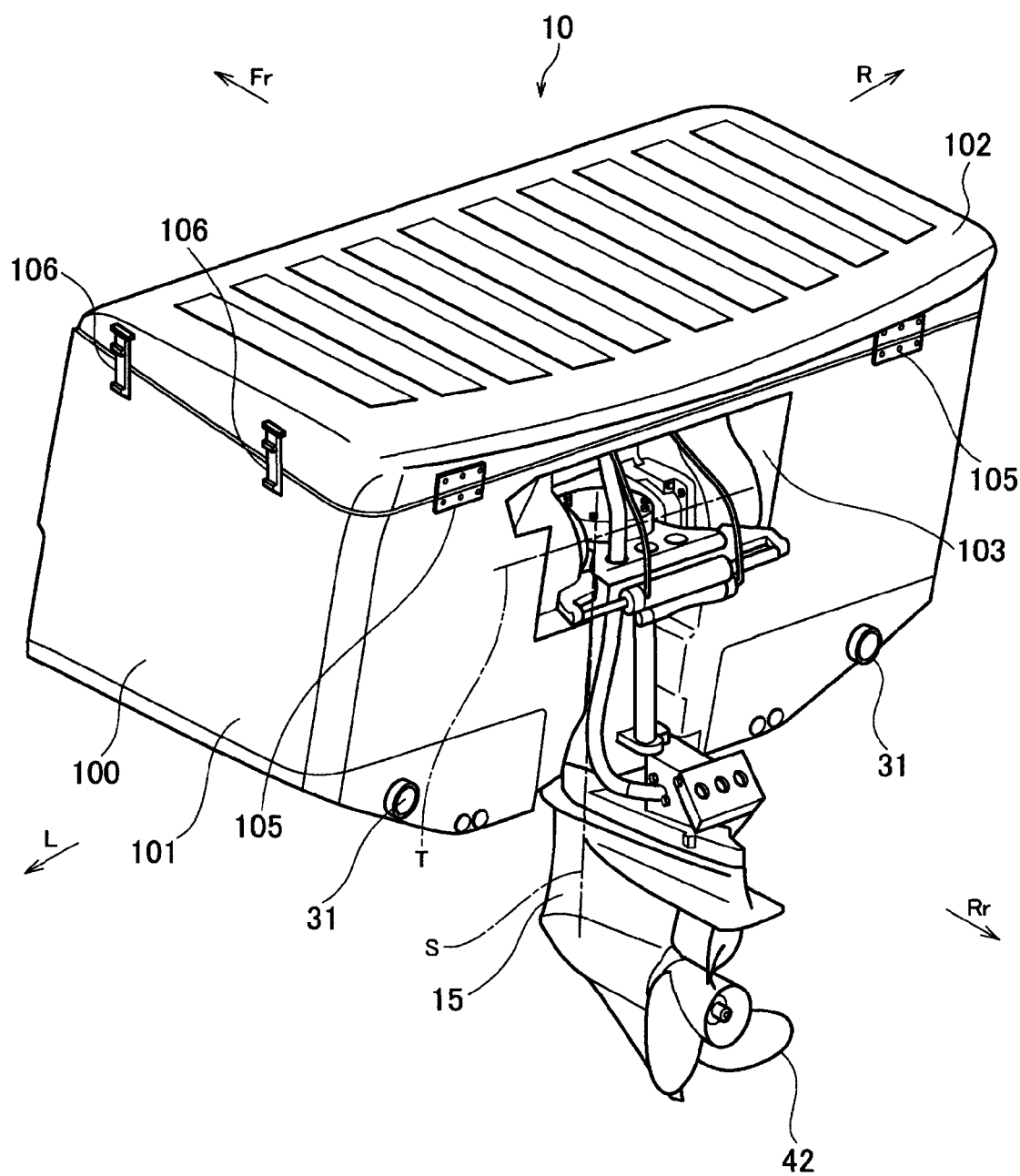
FIG. 2 is a perspective view showing an exterior appearance of the outboard motor of the present invention.
Figure 3:
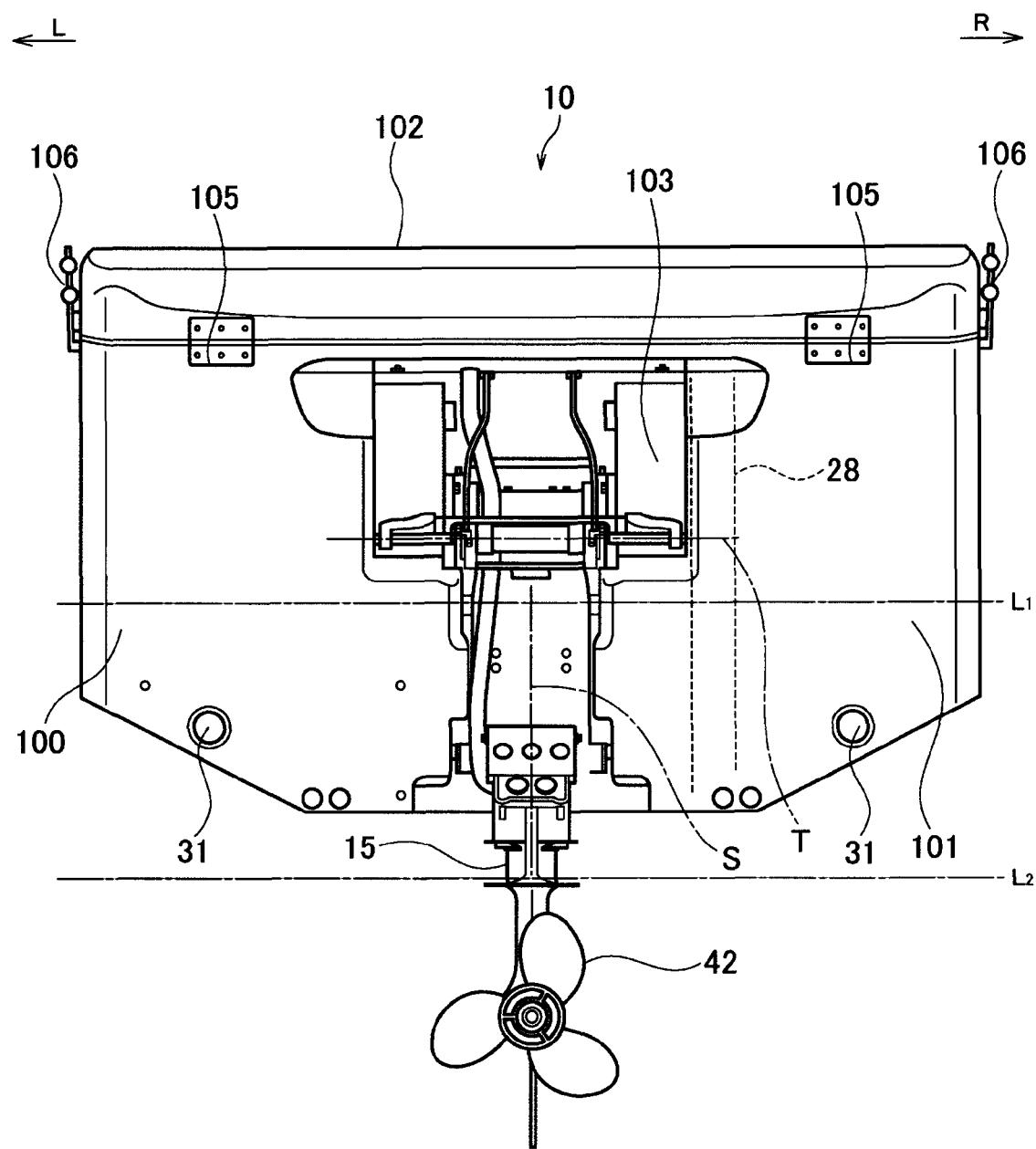
FIG. 3 is a rear view showing the exterior appearance of the outboard motor of the present invention.
Figure 4:
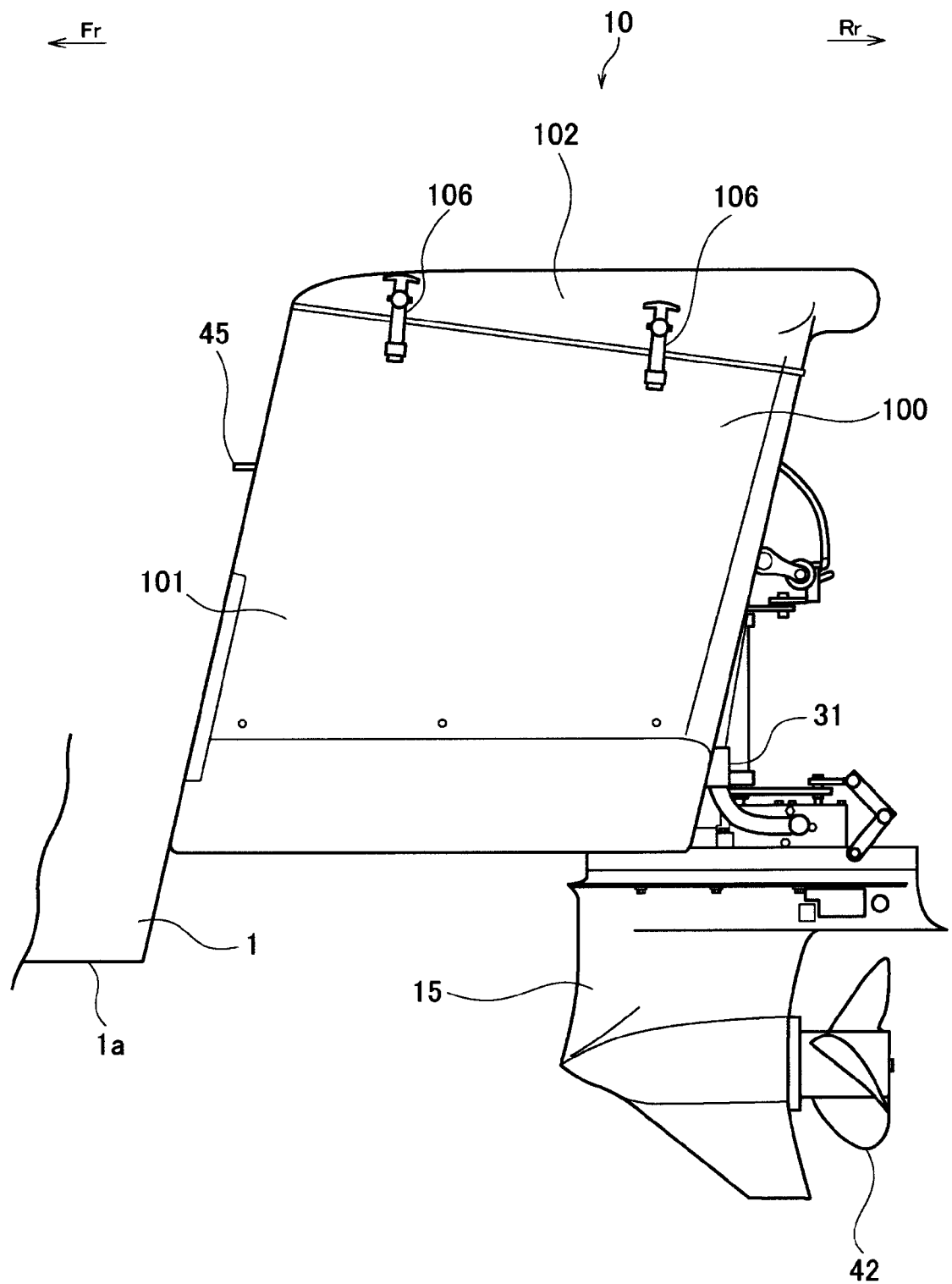
FIG. 4 is a side view showing the exterior appearance of the outboard motor of the present invention.
Figure 5:
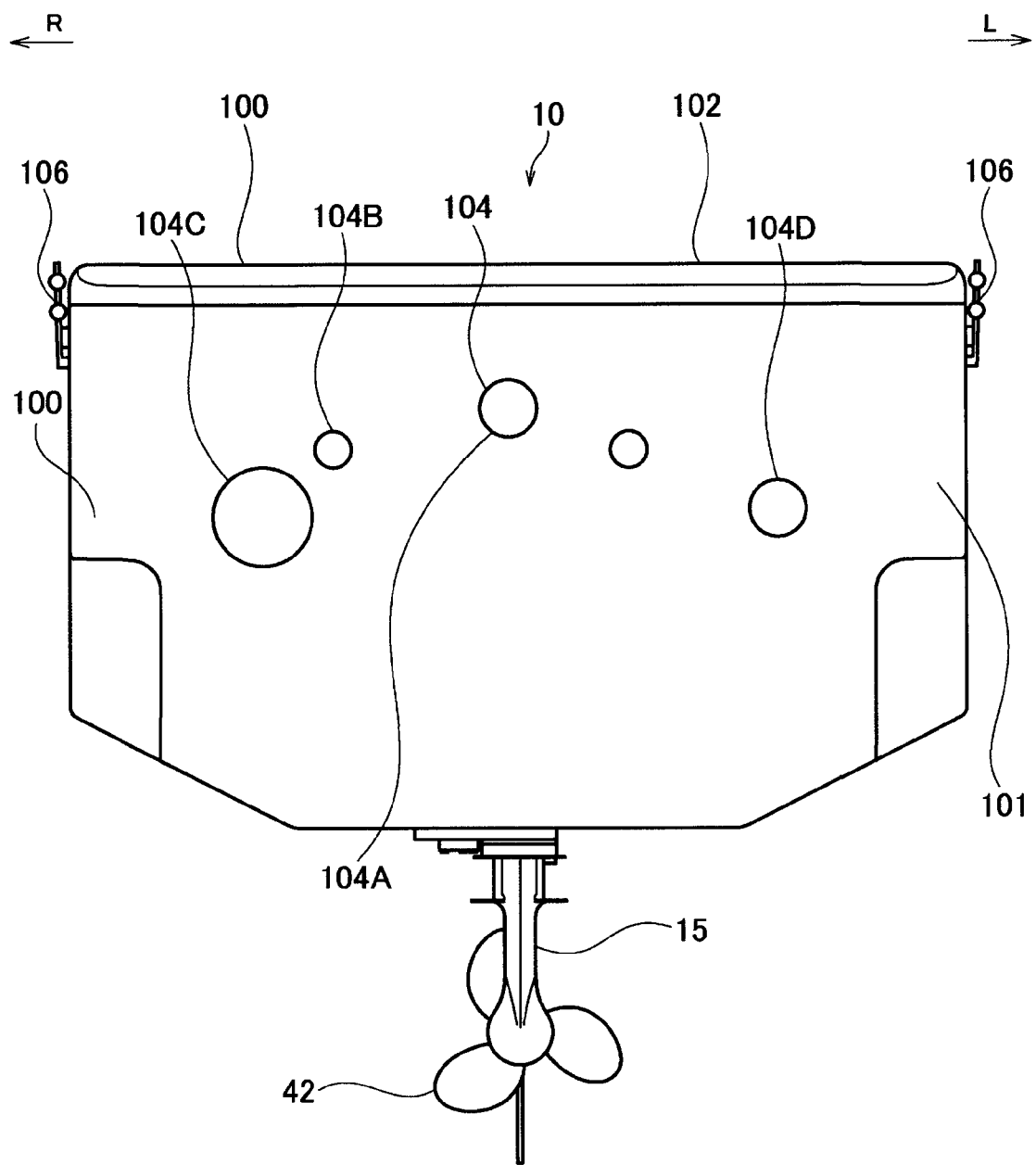
FIG. 5 is a front view showing the exterior appearance of the outboard motor of the present invention.

FIG. 2 to FIG. 5 show an exterior appearance of the outboard motor 10, FIG. 2 being a perspective view of the outboard motor 10, FIG. 3 being a rear view thereof, FIG. 4 being a side view thereof, and FIG. 5 being a front view thereof. The outboard motor 10 has an engine case 100 made of resin. Later-described engine units being power sources are housed in the engine case 100, a screw (propeller) is disposed below a rear portion of the engine case 100, and the screw is driven to rotate by the engine units. The engine case 100 also functions as an exterior member forming the exterior of the outboard motor 10, so that an integrated exterior appearance is presented as a whole.

The engine case 100 is formed as a casing having substantially the same width as that of a stern part (typically, the transom board 2) of the hull 1, as is seen in FIG. 1. In this example, a basic shape of the engine case 100 is a substantially rectangular parallelepiped shape, and a longitudinal direction of the rectangular parallelepiped shape is a beam direction. The engine case 100 has a case main body 101 housing the engine units and their peripheral components or members; and a case cover 102 covering an upper opening of the case main body 101.

Figure 6:
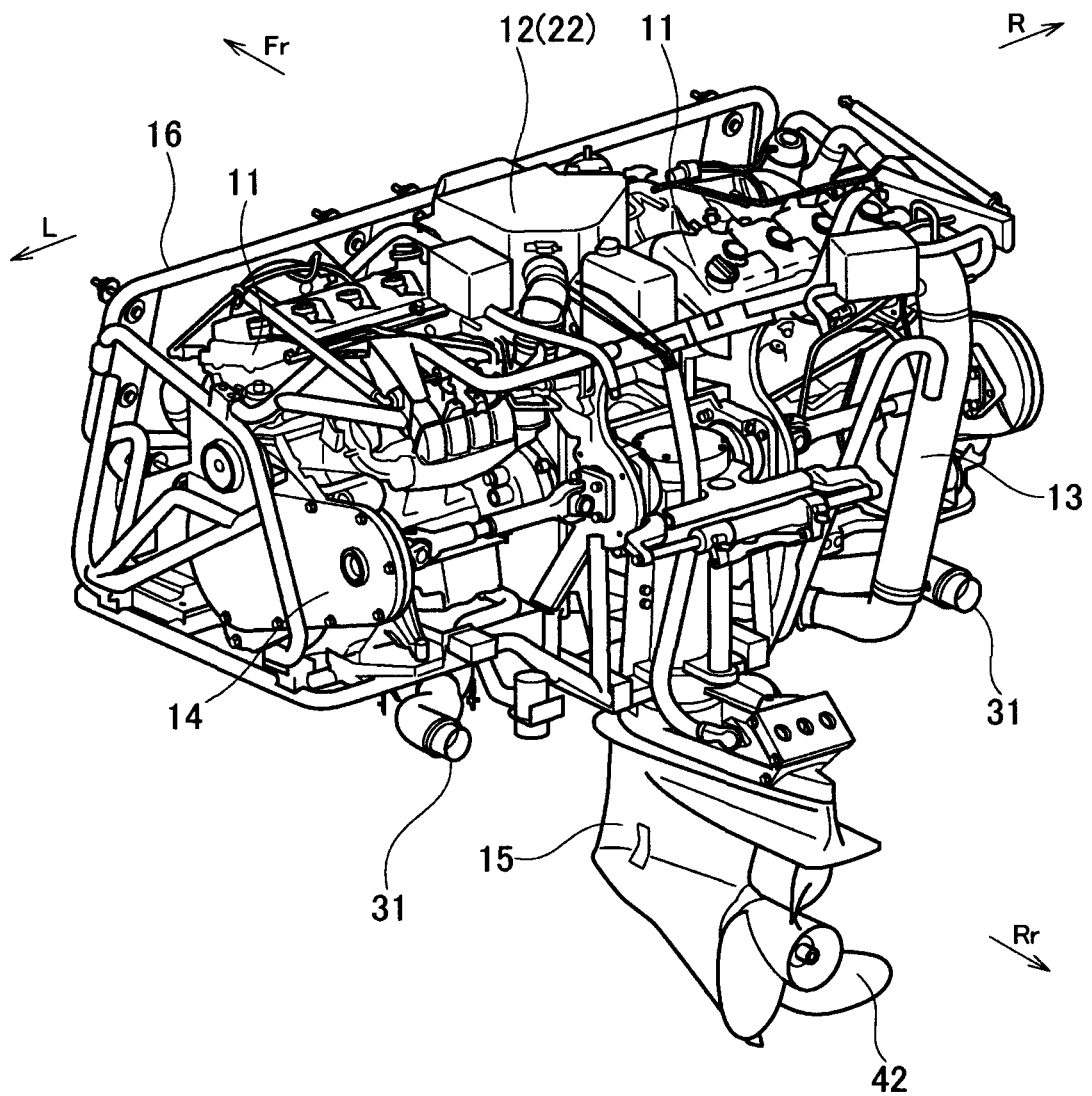
FIG. 6 is a perspective view showing a structure example of an inner part of an engine case in the outboard motor of the present invention.
Figure 7:
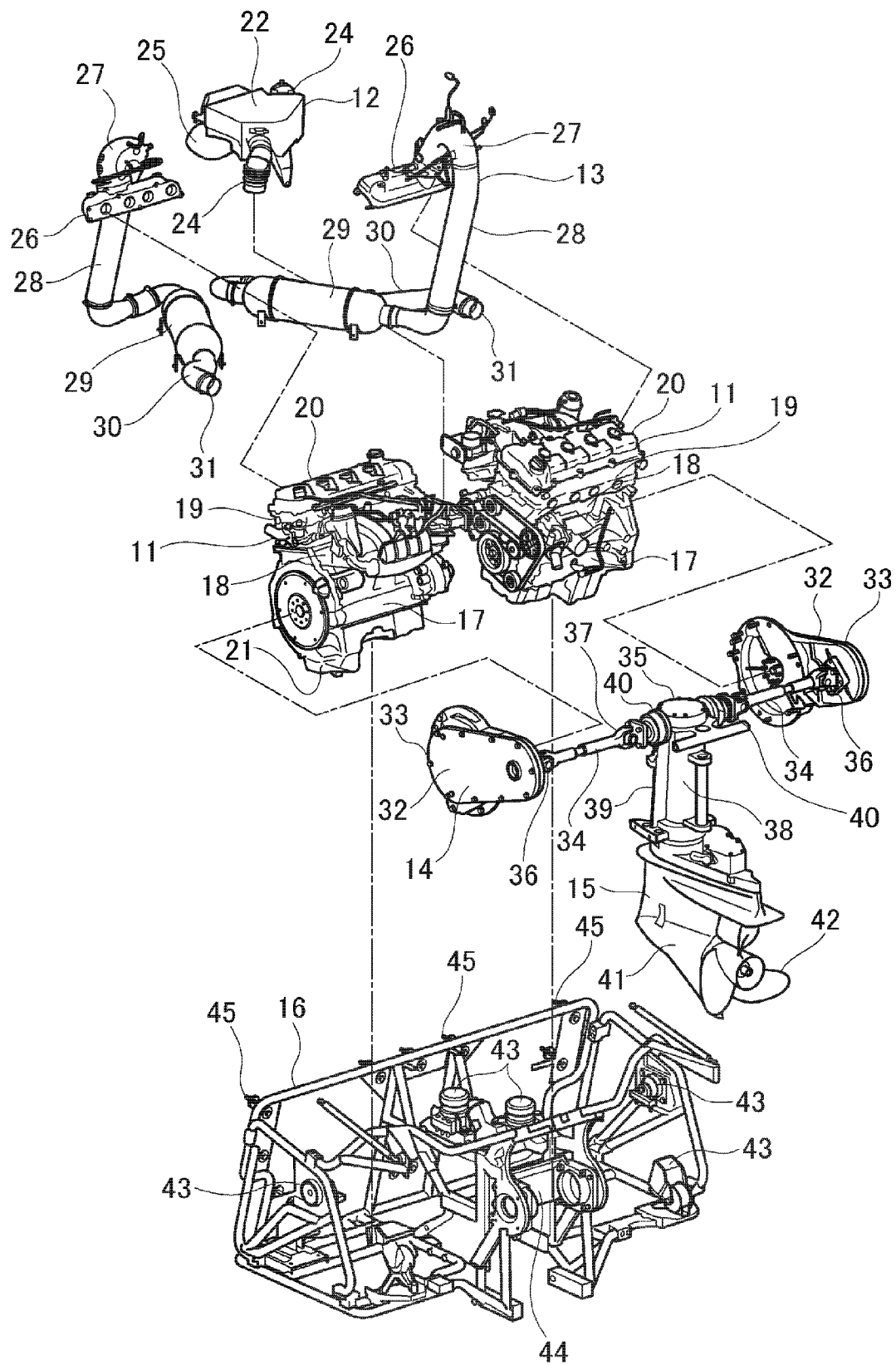
FIG. 7 is an exploded perspective view showing main components in the engine case in the outboard motor of the present invention.

The engine units, their peripheral components, and so on housed in the engine case 100 will be described. The outboard motor 10 of the present invention uses internal combustion engines being power units as its main motive powers and drives the propulsion unit by operating the internal combustion engines. FIG. 6 shows a structure example of an inner part of the engine case 100 in the outboard motor 10, and FIG. 7 is an exploded perspective view of main components in the engine case 100. In the engine case 100, engine units 11 forming the power units are disposed and housed compactly with a good weight balance. In this embodiment, the number of the engine units 11 is two, and on the left and right in the engine case 100 in terms of the beam direction being the longitudinal direction of the casing of the engine case 100, the pair of engine units 11 are arranged across the center. An intake system 12 and an exhaust system 13 are connected to the engine units 11, and a power transmission mechanism 14 is coupled to output ends (crankshafts) of the respective engine units 11. At the back of the engine units 11, a left/right-direction center portion of the power transmission mechanism 14 is joined with a propulsion unit 15, and these outboard motor constituent members are mounted and supported on a frame 16 as shown in FIG. 7.

Figure 8:
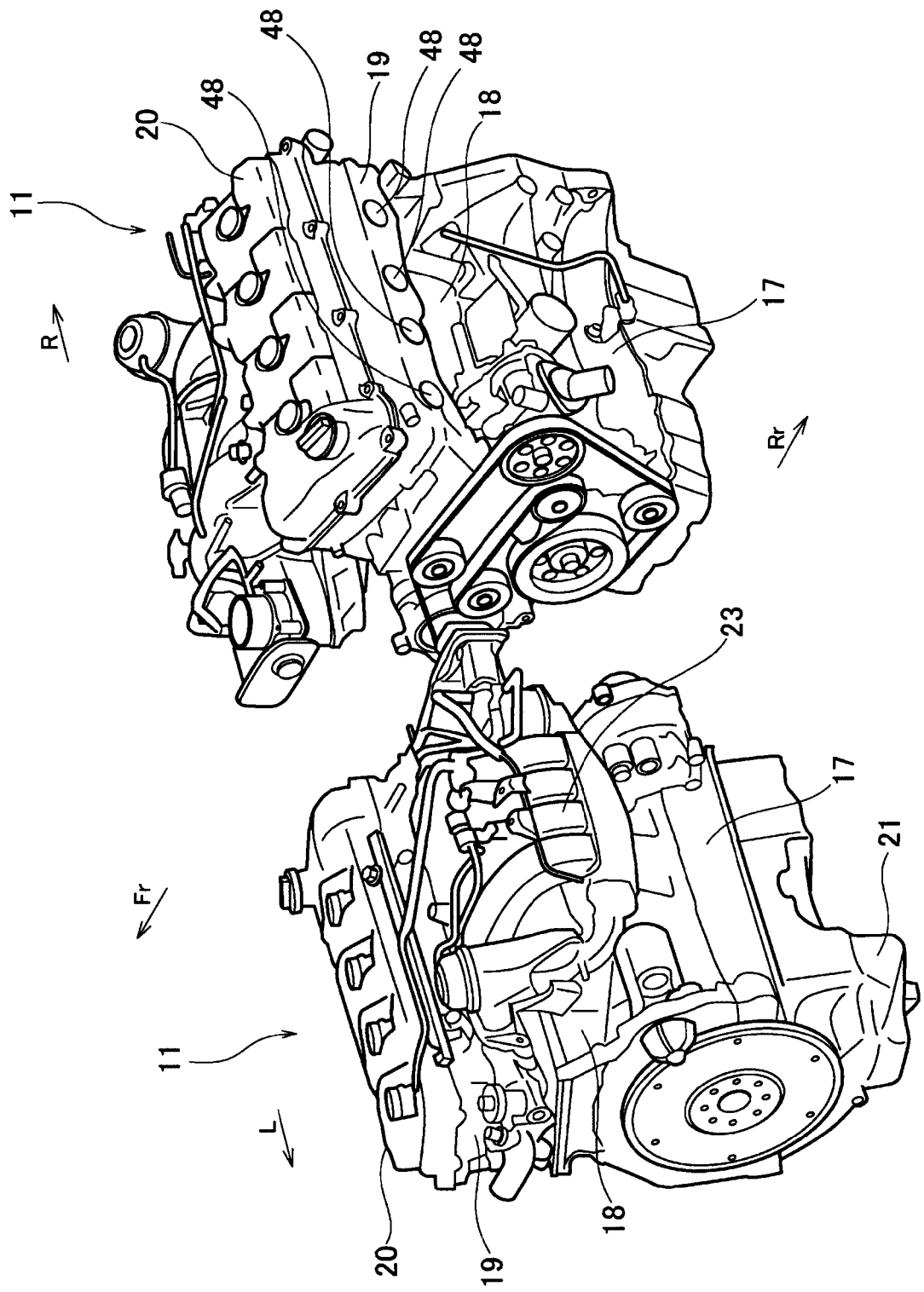
FIG. 8 is a perspective view showing a structure and arrangement example of engine units of the outboard motor of the present invention.

More concretely, in each of the engine units 11, a water-cooled serial 4-cylinder 4-cycle gasoline engine is used in this example. It should be noted that the numbers of the engine cylinders and so on are appropriately changeable as required and are not limited to those in this example. Referring to FIG. 8, in each of the engine units 11, a crankcase 17, a cylinder block 18, a cylinder head 19, and a cylinder head cover 20 are integrally combined so as to be sequentially laid one on another, and an oil pan 21 is attached to the lowest part. The crankshafts of the engine units 11 are disposed along the beam direction (left and right direction) and are arranged so that engine output shafts joined with their shaft ends are located on left and right outer sides, that is, they are arranged so that the engine output shaft of the right engine unit 11 is on the right and the engine output shaft of the left engine unit 11 is on the left.

Next, in the intake system 12, a single air cleaner 22 is disposed between the engine units 11 as shown in FIG. 6. As shown in FIG. 8, intake manifolds 23 are joined with a front side of the cylinder head 19 of the right engine unit 11 and with a rear side of the cylinder head 19 of the left engine unit 11 respectively, and these intake manifolds 23 and the air cleaner 22 are connected via intake pipes 24 respectively. A suction pipe 25 extends from a front surface portion of the air cleaner 22 up to a hull 1 side in front of the engine case 100 (see FIG. 9), and air is taken in from an air intake port at its tip. The air intake port is disposed in a room or a space not exposed to waves, splashes, rain, and so on in the hull 1. As shown in FIG. 8, the single suction pipe 25 branches into a plurality of (four in this example) parts in the intake manifold 23 in each of the engine units 11.

In the exhaust system 13, as shown in FIG. 7 and so on, exhaust manifolds 26 are joined with a rear side of the cylinder head 19 of the right engine unit 11 and a front side of the cylinder head 19 of the left engine unit 11 respectively and are each connected to a single exhaust pipe 27. Exhaust hoses 28 made of rubber are connected to the exhaust pipes 27, and mufflers 29 are connected to the exhaust hoses 28. Exhaust hoses 30 are connected to the mufflers 29 and exhaust gas is discharged from exhaust exits 31 attached to the exhaust hoses 30.

The mufflers 29 are disposed on an outer side of a lower surface of the case main body 101 of the engine case 100. In this case, the mufflers 29, the exhaust hoses 30, and so on are disposed practically so as not to project from the lower surface of the case main body 101, and the exhaust gas is discharged into water from the exhaust exits 31 disposed near lower portions of left and right sides of a rear surface of the case main body 101 in a laterally well-balanced manner.

The power transmission mechanism 14 transmits outputs of the engine units 11 to the propulsion unit 15. In the power transmission mechanism 14, speed reducers 32 are coupled to the engine output shafts of the left and right engine units 11 as shown in FIG. 7. Gear groups rotatably supported are provided in casings 33 of the speed reducers 32 and tie rods 34 are coupled to output shafts of the gear groups. The left and right tie rods 34 are concentrically and horizontally arranged in the left and right direction and are coupled to an intermediate speed reducer 35 at a laterally center portion. Both ends of each of the tie rods 34 are coupled to the speed reducer 32 and the intermediate speed reducer 35 via universal joints 36, 37 respectively. The tie rods 34 have spline engagement structures at appropriate places in the middle of their axial direction and their whole length is extendable and contradictable.

The intermediate speed reducer 35 includes: a pair of input-side bevel gears coupled to the tie rods 34 respectively; and an output-side bevel gear engaged with the input-side bevel gears. The output-side bevel gear is coupled to a drive shaft in a drive shaft case 38, and the intermediate speed reducer 35, the drive shaft case 38, and a swivel bracket 39 are integrally combined with one another. The drive shaft extends downward from the intermediate speed reducer 35. These swivel bracket 39 and so on are pivotably supported by the case main body 101 via a bearing 40.

The propulsion unit 15 is disposed under the drive shaft case 38 as shown in FIG. 7 and so on. The propulsion unit 15 includes a gear case 41 having a built-in gear for propeller driving, and as a whole presents a in shape. A propeller 42 is suspended on a rear end portion of the gear case 41. The drive shaft passes in the drive shaft case 38, further extends out downward, and reaches the inside of the gear case 41. A final speed reducer is formed in the gear case 41, and the propeller 42 can be driven to rotate via the final speed reducer.

There are further provided a tilting mechanism and a steering mechanism for the propulsion unit 15. A detailed description thereof will be omitted, but the tilting mechanism can first pivot the intermediate speed reducer 35, the drive shaft case 38, and the propulsion unit 15 as a unit in an up and down direction around a tilt axis T (see FIG. 2 and FIG. 3). The tilt axis T is set coaxially with the tie rods 34, and the propulsion unit 15 can tilt around the tilt axis T. Incidentally, the tilting mechanism may include a drive unit generally called a power trim-tilt (PIT) or the like to form an electro-hydraulic tilting mechanism.

Further, the propulsion unit 15 is pivotable in a yaw direction (left and right direction) (yawing) around a steering axis S (see FIG. 2 and FIG. 3) by the steering mechanism. The steering mechanism has a steering cylinder hydraulically driven in an electro-hydraulic manner, and reciprocates the steering cylinder along a steering rod by using a hydraulic pump as a hydraulic source, thereby capable of pivoting the propulsion unit 15 in the left and right direction, that is, capable of making the propulsion unit 15 perform a steering operation The above-described main constituent members of the outboard motor 10 are mounted and supported on the frame 16 as shown in FIG. 6. The frame 16 is made of a material such as a steel pipe and is formed to have a contour substantially along the rectangular parallelepiped shape of the casing forming the engine case 100 as shown in FIG. 7. A plurality of engine mounts 43 used to mount and support the engine units 11 are disposed at predetermined places of the frame 16, and the engine units 11 are mounted on the frame 16 via the engine mounts 43. Further, a main bracket 44 on which the aforesaid bearing 40 for supporting the swivel bracket 39 and so on is mounted is attached to a rear part of the frame 16.

Further, a plurality of transom bolts 45 are attached on a front surface portion of the frame 16 so as to project forward. The outboard motor constituent members such as the engine units 11 are mounted on the frame 16, and the frame 16 on which they are mounted is housed in the engine case 100. The transom bolts 45 pass through a front surface portion of such a case main body 101 of the engine case 100 to be fastened to the transom board 2, so that the whole engine case 100 can be fixedly fastened to the transom board 2. Incidentally, seals, packings, or the like are put on the transom bolts 45 projecting from the case main body 101 to ensure water tightness.

As described above, the engine case 100 has: the case main body 101 housing the engine units 11 and their peripheral components; and the case cover 102 covering the upper opening of the case main body 101. When the case main body 101 is closed with the case cover 102, the inside of the engine case 100 becomes a substantially hermetical space, so that high water tightness is ensured. In this case, the constituent members of the outboard motor 10 are supported by the frame 16, the frame 16 not only holds the engine units 11 but also receives a propulsive force and a steering force of the propulsion unit 15, that is, no load is applied to the engine case 100 itself. Further, the engine case 100 also functions as an exterior member of the outboard motor 10 and is mounted on the outboard motor 10 as shown in FIG. 1, so that the whole structure presents an integrated exterior appearance.

As shown in FIG. 2 to FIG. 4 and so on, in the rear surface side of the case main body 101, an indented portion 103 formed so as to be indented toward the inside of the case main body 101 is provided at a beam-direction center portion in a region from the rear surface portion to a bottom portion of the case main body 101. Around the indented portion 103, the propulsion unit 15 forming a propulsion device and its tilting and steering mechanisms, and so on are disposed. The indented portion 103 is formed to extend forward from the rear surface side of the case main body 101, but there is provided a gap having a size necessary and sufficient for preventing the interference with the case main body 101 when the tilting mechanism and the steering mechanism or their peripherals, members, and so on perform the tilting or steering operation.

Further, the fixtures such as the fuel tank and the battery are disposed on the hull 1 side as previously described, and these fixtures and the outboard motor 10 are connected or coupled. In this case, a plurality of through holes 104 are formed so as to penetrate through the front surface portion of the case main body 101 and the transom board 2 as shown in FIG. 5. Specifically, a through hole 104A through which the suction pipe 25 for supplying fuel air to the engines is inserted, a through hole 104B through which a fuel pipe for supplying fuel from the fuel tank to the engines is inserted, a through hole 104C through which a ventilation air cylinder for ventilating the inside of the engine case 100 passes, and so on are formed. Further, a through hole 104D through which cords or cables electrically (including a control signal and so on) or mechanically connecting devices, instruments, or members in the engine case 100 to a steering gear of the hull 1 side are inserted is formed. Note that these through holes 104 are provided with members (seals or the like) for keeping water tightness when the suction pipe 25 and so on are mounted.

The case cover 102 forms an upper surface portion of the engine case 100, and as shown in FIG. 2 or FIG. 3, is pivotably joined with the case main body 101 via hinges 105 near an upper end of the rear portion of the case main body 101. When the case cover 102 is opened by pivoting around the hinges 105, the inside of the engine case 100 is opened, whereby the exposed engine units 11 and so on in the engine case 100 are freely accessible. Opening the case cover 102 can facilitate the inspection and so on of the inside, and can improve convenience of these types of works.

Seals are laid over closure portions or mating surfaces of the case main body 101 and the case cover 102, so that high water tightness of the engine case 100 is ensured when the case main body 101 is closed with the case cover 102. In this case, the seals are laid along the whole peripheries of the mating surfaces of the case main body 101 and the case cover 102. When the case cover 102 is closed, the seals are sandwiched between the case cover 102 and the closure portion of the case main body 101, whereby high water tightness of the engine case 100 can be obtained.

Further, lock mechanisms 106 shown in FIG. 2 to FIG. 4 are provided in order to fix and keep the case cover 102 in the closure state when the case main body 101 is closed with the case cover 102.

Further, a holding mechanism capable of keeping the case cover 102 opened is provided, and the holding mechanism, a detailed description of which is omitted, is capable of keeping the case cover 102 opened relative to the case main body 101.

In the above case, in addition to the above-described constituent members of the outboard motor 10, cooling pipe systems of the engine units 11, hydraulic pipe systems for driving the tilting mechanism and the steering mechanism, or electric signal lines or cords for exchanging electric signals, power, and the like among the members, and so on are laid at appropriate places in the engine case 100, and auxiliary machines necessary for driving the outboard motor 10 are installed. The outboard motor 10 is properly driven via these pipe systems and so on or by the operation of the auxiliary machines.

Figure 9:
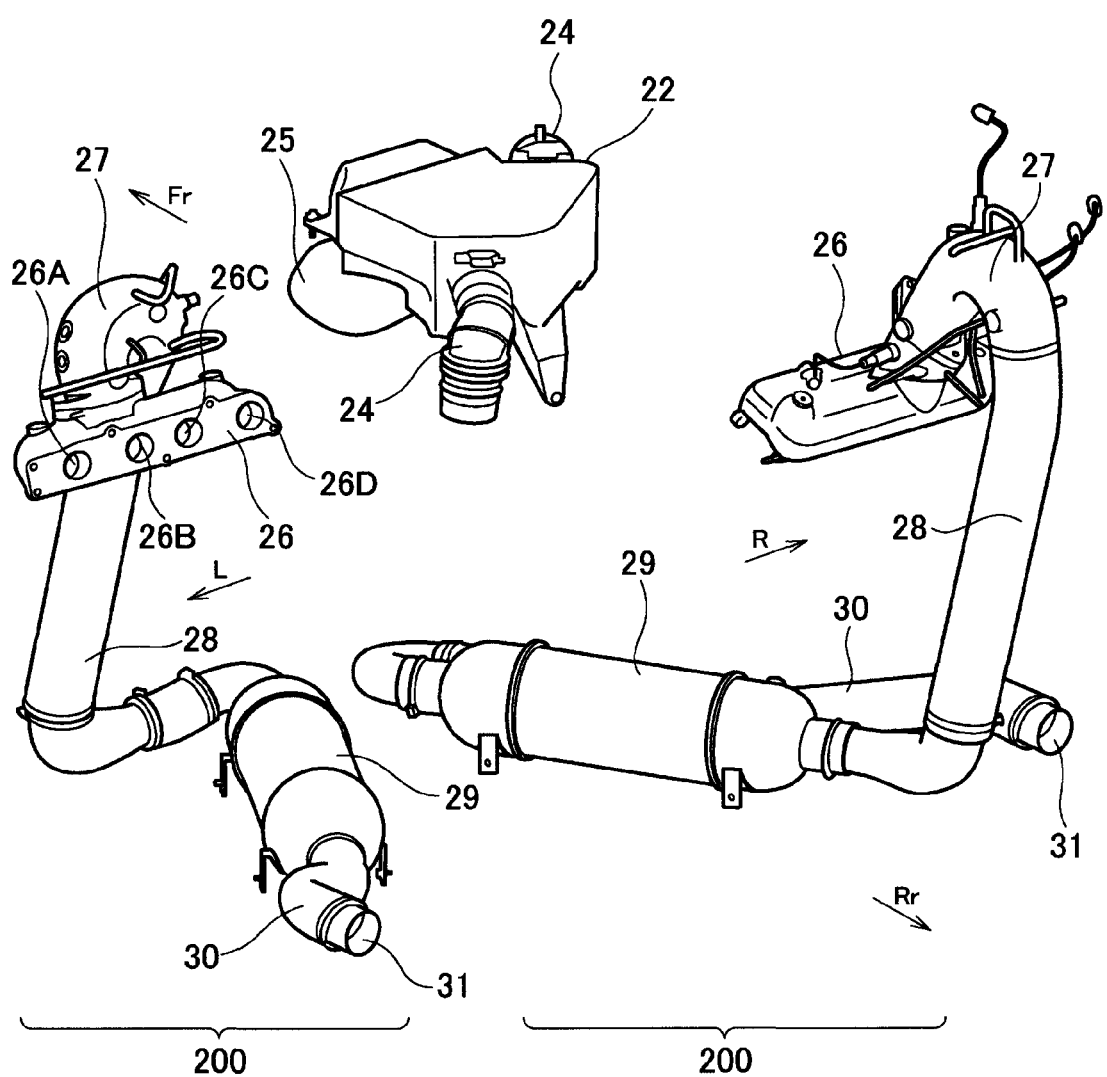
FIG. 9 is a perspective view showing a structure example of exhaust devices in intake and exhaust systems of the outboard motor of the present invention.
Figure 10A:
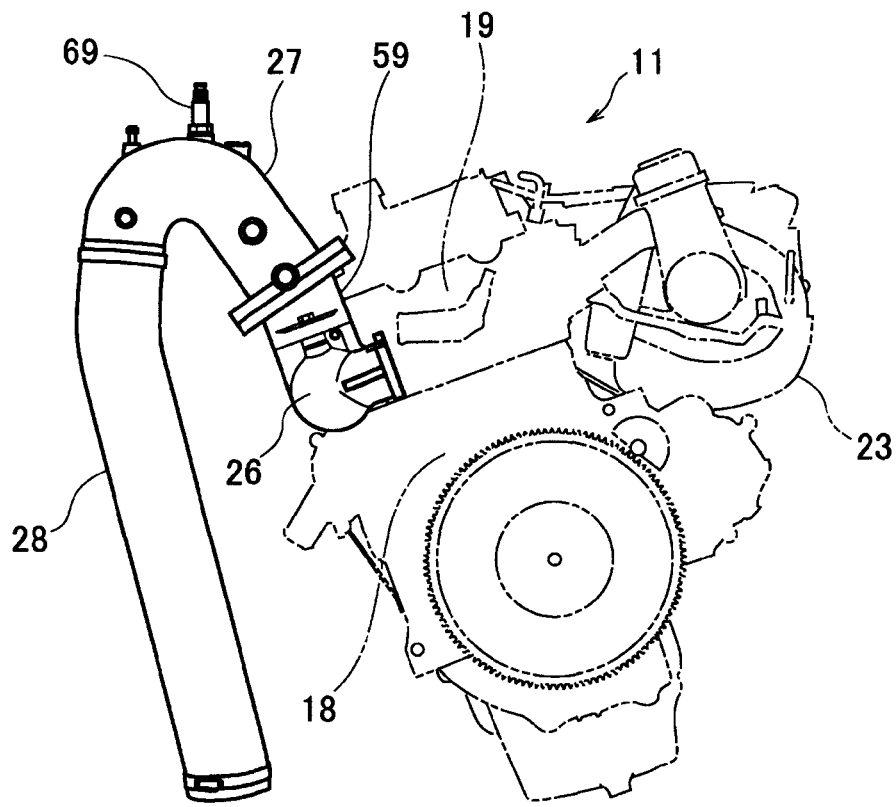
FIG. 10A is a side view showing an arrangement and structure example of the exhaust device of the outboard motor of the present invention in relation to the engine side.
Figure 10B:
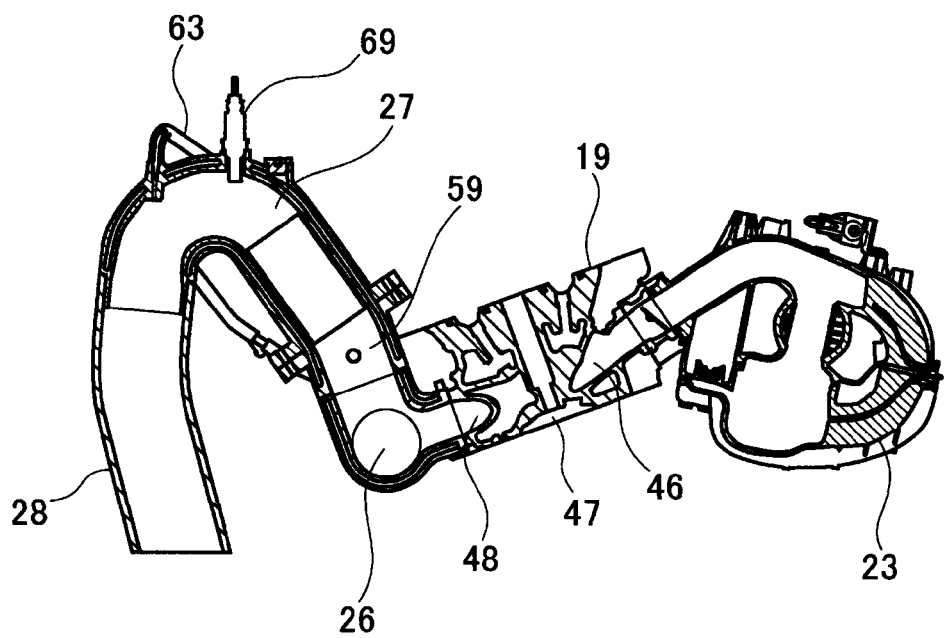
FIG. 10B is a side sectional view showing the arrangement and structure example of the exhaust device of the outboard motor of the present invention in relation to the engine side and showing an arrangement and structure example of the intake and exhaust systems around a cylinder head.

In the present invention, there are provided exhaust devices 200 including the exhaust manifolds 26, the exhaust pipes 27, the exhaust hoses 28, the mufflers 29, the exhaust hoses 30, and so on in the exhaust system 13 as shown in FIG. 9. The exhaust devices 200 discharge combustion gas generated in the engines, and the intake manifold 23 and the exhaust manifold 26 are joined with both sides of each of the cylinder heads 19, across the cylinder head 19 as shown in FIG. 10A and FIG. 10B. The intake manifold 23 is connected to intake ports 46 of the respective cylinders, and mixed gas is supplied to the intake ports 46. The mixed gas sucked into a combustion chamber 47 from the intake ports 46 is discharged to exhaust ports 48 after exploding. The exhaust ports 48 of the respective cylinders are connected to the exhaust manifold 26, and the exhaust gases from the cylinders join at the exhaust manifold 26 and pass through the exhaust pipe 27 and further the muffler 29 to be discharged into water from the exhaust exit 31.

Figure 11A:
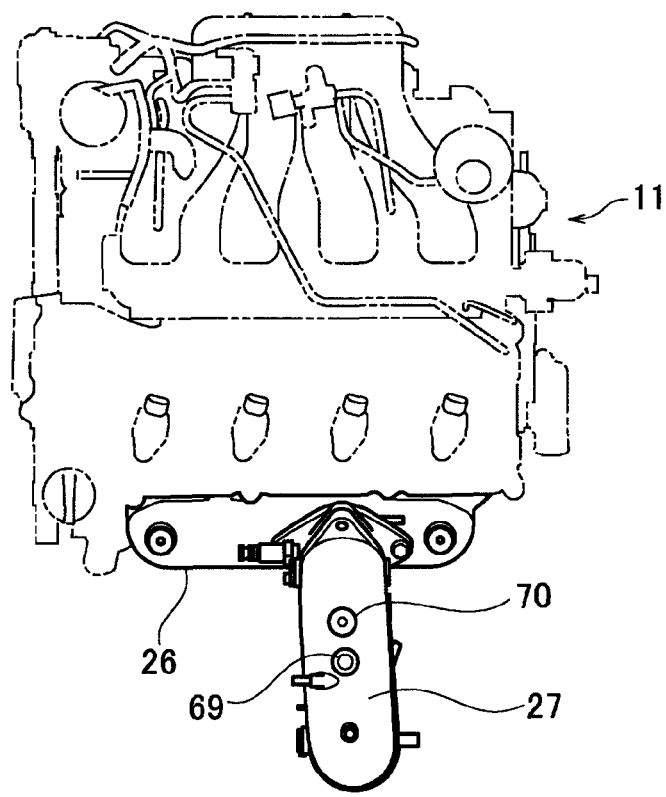
FIG. 11A is a top view showing the arrangement and structure example of the exhaust device of the outboard motor of the present invention in relation to the engine side.
Figure 11B:
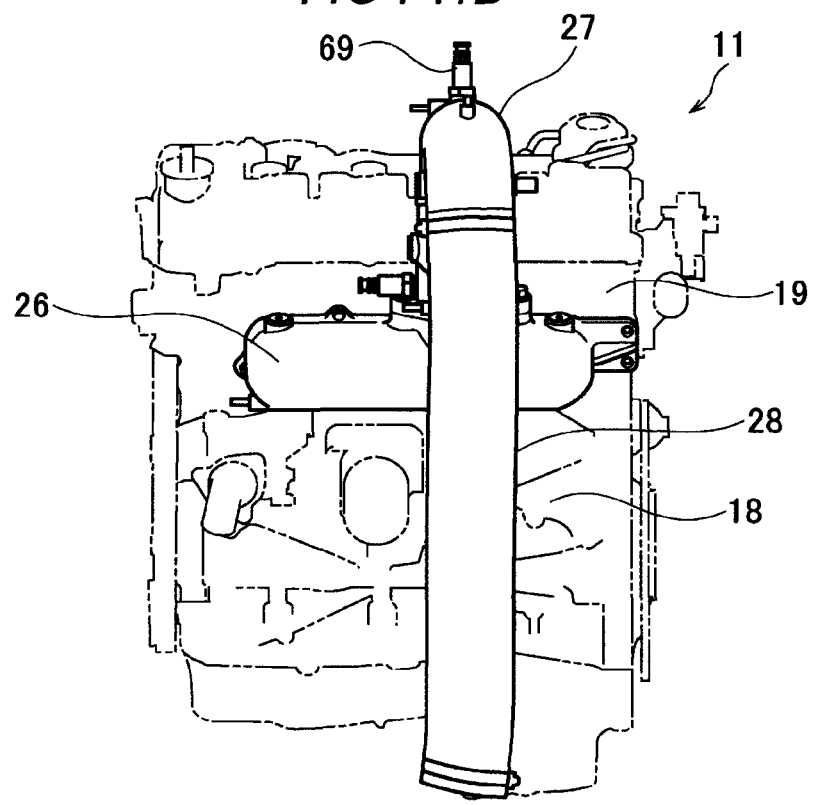
FIG. 11B is a front view showing the arrangement and structure example of the exhaust device of the outboard motor of the present invention in relation to the engine side.

As shown also in FIG. 11A and FIG. 11B, the exhaust manifold 26 extends in a cylinder arrangement direction, that is, in the beam direction, on the exhaust port 48 side of the engine unit 11. The exhaust pipe 27 extends from the exhaust manifold 26, is directed substantially upward, is folded while curving substantially in a U-shape, and is connected to the exhaust hose 28. The exhaust pipe 27 thus curving is disposed to have a siphon shape. The exhaust hose 28 extends downward substantially linearly and is connected to the muffler 29 disposed on a bottom portion of the engine case 100 while appropriately curving.

Figure 12A:
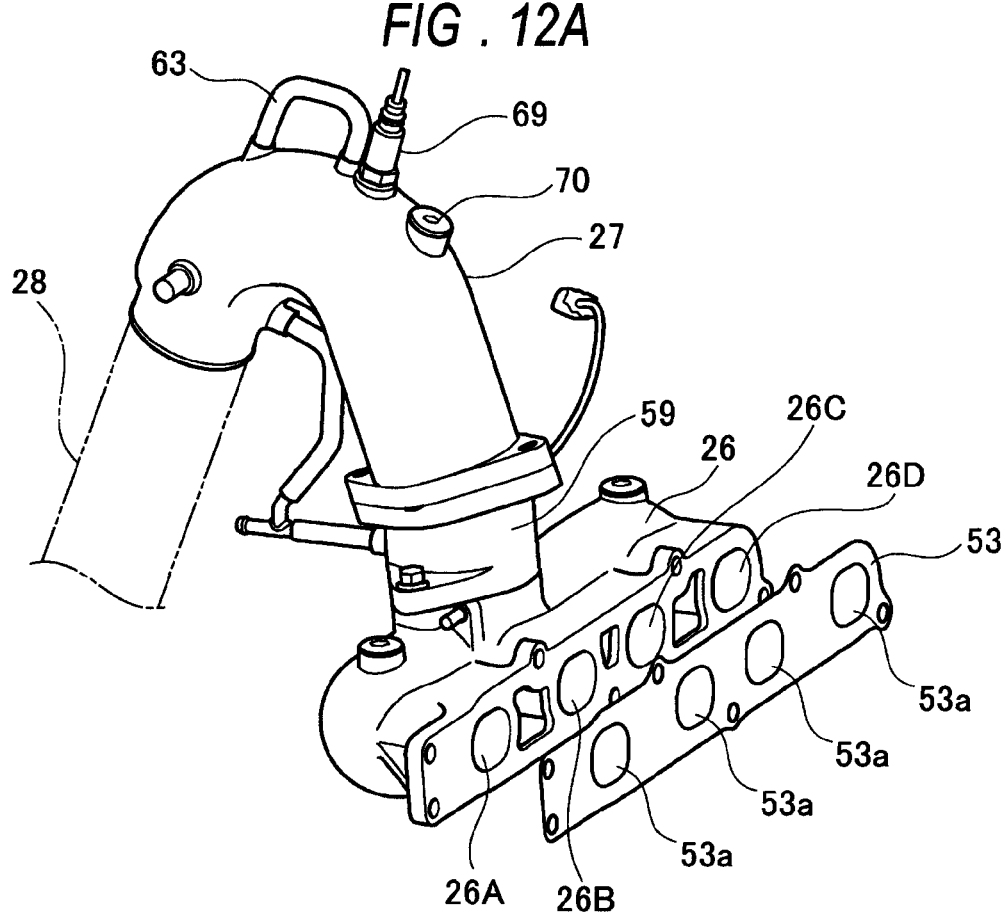
FIG. 12A is a perspective view showing the vicinity of an exhaust manifold to an exhaust pipe in the exhaust device of the outboard motor of the present invention.
Figure 12B:
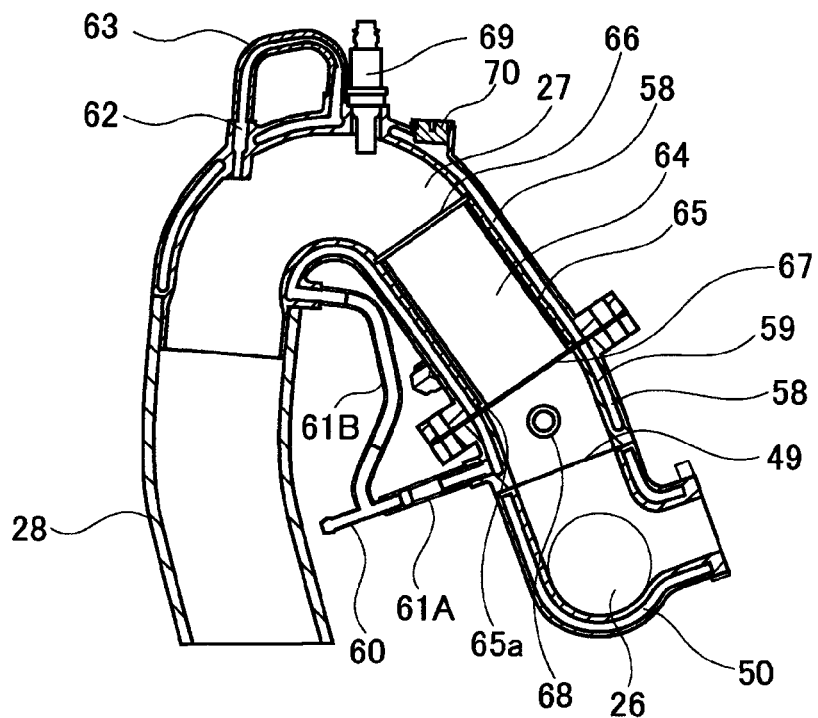
FIG. 12B is a cross-sectional view showing the vicinity of the exhaust manifold to the exhaust pipe in the exhaust device of the outboard motor of the present invention.

FIG. 12A and FIG. 12B show the vicinity of the exhaust manifold 26, the exhaust pipe 27, and the exhaust hose 28 which are connected to one another. In this example, being serial 4-cylinder engines, the engine units 11 each have four manifolds 26A to 26D as shown in FIG. 12A, and the manifolds 26A, 26B, 26C, 26D are connected to the exhaust ports 48 of the corresponding cylinders respectively. In this example, the manifolds 2621 to 26D join near the #2 or #3 cylinder to communicate with an opening 49 formed to face upward as an exhaust open end.

A water jacket 50 is attached and formed so as to cover outer sides of exhaust channels formed in the exhaust manifold 26, that is, the manifolds 26A to 26D. The water jacket 50 is formed not only on the outer sides of the exhaust channels but also between the manifolds 26A to 26D, that is, between the manifolds 26A and 2651, between the manifolds 2651 and 26C, and between the manifolds 26C and 26D, and all the water jackets 50 communicate with one another. In the engine unit 11, an engine used therein is of a water cooled type, water-cooling water jackets are formed on the cylinder block 18 and the cylinder head 19, an ordinary circulation cooling liquid (called LLC: long life coolant or the like) is used as a cooling medium of the water jackets, and a cooling water pump (not shown) for circulating the circulation cooling liquid is provided. The cooling water pump uses a driving force of the engine of the engine unit 11 as its driving source.

Figure 13A:
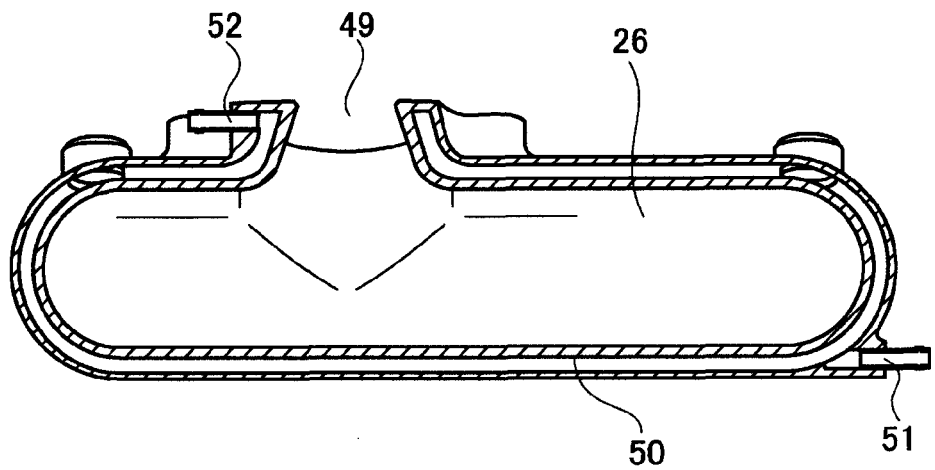
FIG. 13A is a vertical sectional view of the exhaust manifold in the exhaust device of the outboard motor of the present invention.
Figure 13B:
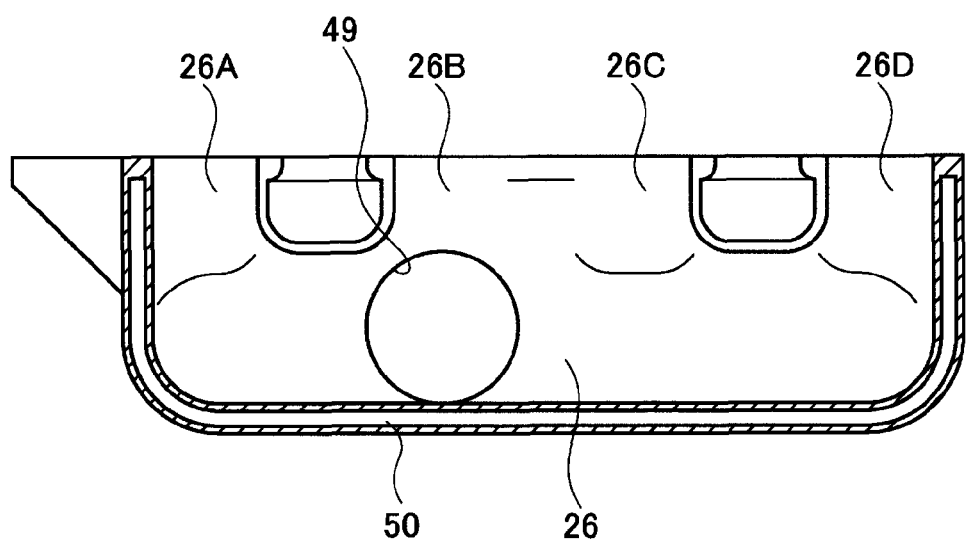
FIG. 13B is a horizontal sectional view of the exhaust manifold in the exhaust device of the outboard motor of the present invention.
Figure 13C:
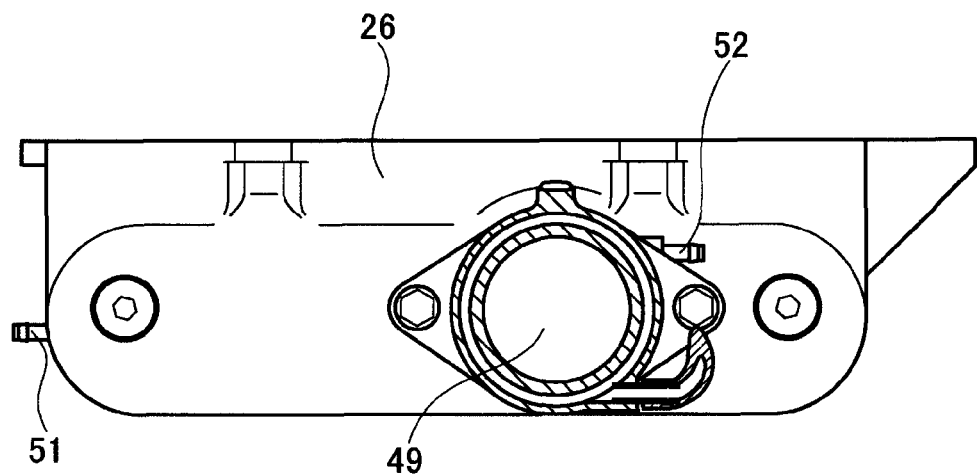
FIG. 13C is a top view of the exhaust manifold in the exhaust device of the outboard motor of the Present invention.

In this embodiment, the aforesaid engine cooling coolant is used as the cooling medium flowing in the water jacket 50 of the exhaust manifold 26, and in addition, the aforesaid cooling water pump of the engine unit 11 is used in order to circulate the coolant. As shown in FIG. 131 and FIG. 13C, the water jacket 50 of the exhaust manifold 26 has a fill port 51 through which the cooling medium, that is, the coolant, is fed from a lower end portion of the exhaust manifold 26, and a discharge port 52 for discharging the coolant from an upper end portion of the exhaust manifold 26. The coolant fed from the fill port 51 is circulated in the water jacket 50 to be discharged from the discharge port 52. The fill port 51 and the discharge port 52 are connected to the water jacket formed on the engine of the engine unit 11 via respective connection hoses. In this case, since the water jackets of the engine and the exhaust manifold 26 are not adjacent to each other, the cooling water does not leak to an area under high-temperature environment between the exhaust manifold 26 and the cylinder head 19.

Further, a gasket 53 shown in FIG. 12A is interposed in a connection portion of the cylinder head 19 and the exhaust manifold 26, and the gasket 53 is sandwiched from both sides by the cylinder head 19 and the exhaust manifold 26. The gasket 53 has four open holes 53a corresponding to the openings of the manifolds 26A to 26D. In this case, a portion except the manifolds 26A to 26D, that is, a portion corresponding to the water jacket 50 is substantially closed, and the exhaust gas flows in the connection portion between the cylinder head 19 and the exhaust manifold 26, but the cooling water is shut out.

Here, FIG. 14 is a block diagram schematically showing a cooling system including circulation channels for the cooling water and so on. The water jacket of the cylinder block 18 and the cylinder head 19 in the engine unit 11 and the water jacket 50 of the exhaust manifold 26 communicate with each other via the fill port 51 and the discharge port 52 as described above. In this cooling system, the cooling water is constantly circulated in the engine and the exhaust manifold 26 by the cooling water pump 54 driven by the engine. Further, a heat exchanger 55 for cooling the cooling water is mounted, and the heat exchanger 55 cools the cooling water. In the heat exchanger 55, for example, the cooling water from the water jacket of the engine is led into the heat exchanger 55, and seawater or fresh water around the outboard motor 10 is pumped up by a draw pump 56 to be supplied to the heat exchanger 55. Then, the seawater or the like deprives the high-temperature cooling water of heat while flowing in the heat exchanger 55, to thereby cool the cooling water. Further, thermostats 57 are inserted at appropriate places in the middle of the cooling system circulation channels, and when the engine is warmed to increase the temperature of the cooling water to a predetermined temperature or higher, valves of the thermostats 57 are opened to let the cooling water flow into the heat exchanger 55, so that the temperature of the cooling water lowers.

The exhaust pipe 27 curves in the siphon shape as described above, and a water jacket 58 is attached so as to annularly cover an outer side of at least a front half portion of the siphon shape as shown in FIG. 12B, and the seawater is directly supplied into the water jacket 58 to flow therein. Note that in the example shown in FIG. 12S, the water jacket 58 is further formed up to a rear half region of the siphon shape. Further, the exhaust pipe 27 is joined with the exhaust manifold 26 via an intermediate pipe 59, and a periphery of the intermediate pipe 59 is also covered by the water jacket 58. The seawater or the water discharged from the heat exchanger 55 is discarded to the outside of the outboard motor 10, but is partly supplied to the water jacket 58. In this case, its water channel passes through a branch pipe 60 from the heat exchanger 55, and one of the branching pipes is connected to a lowest portion of the water jacket 58 via a feed hose 61A, and the other pipe is connected to an exhaust-direction rear end portion of the water jacket 58 via a feed hose 61B.

Further, the seawater is discharged into an exhaust channel in the rear half portion of the siphon shape of the exhaust pipe 27. In this case, as shown in FIG. 12B, an injection nozzle 62 is mounted immediately after a top portion of the siphon shape of the exhaust pipe 27, and the seawater is discharged from the injection nozzle 62 so as to be directed in a downstream direction of the exhaust channel of the exhaust pipe 27. A pipe 63 for supplying the seawater to the injection nozzle 62 is provided, and one end of the pipe 63 is connected to the top portion of the siphon shape of the exhaust pipe 27, that is, an uppermost portion of the water jacket 58. Further, the other end of the pipe 63 is connected to the injection nozzle 62. In this manner, the seawater in the water jacket 58 is once led out from the uppermost portion to the upper outside via the pipe 63, and is led into the injection nozzle 62 mounted on the exhaust channel of the exhaust pipe 27.

As described above, the branch pipe 60 is used to feed the seawater from the lowest portion of the water jacket 58 especially via the feed hose 61A, and the seawater is led out to the injection nozzle 62 from an exit provided at the upper most portion. Therefore, there occurs no air lock in a seawater channel in the water jacket 58. In addition, when the engine is stopped, all the water flows back to be discharged from the lowest portion of the water jacket 58. Further, the injection nozzle 62 is installed so that the seawater is discharged from the top of the siphon shape to be directed in the downstream direction of the exhaust channel, which prevents later-described catalyst and oxygen sensor from being splashed with water droplets.

A catalyst 64 is disposed in the front half portion of the siphon shape of the exhaust pipe 27, that is, in a portion before the top of the siphon shape. This catalyst 64 is housed and held while being wrapped by a tubular holder 65 from an outer side. A snap ring 66 is put on an exhaust-channel downstream side of the holder 65 to position the holder 65, and the holder 65 has a flange portion 65a on an upstream side, and is held by being sandwiched between the snap ring 66 and an end surface of the intermediate pipe 59. A gasket 67 is put on a joint portion between the exhaust pipe 27 and the intermediate pipe 59, including a region of the water jacket 58.

Further, an air-fuel ratio (A/F) sensor 68 and an oxygen sensor 69 are disposed on exhaust-channel upstream side and downstream side of the catalyst 64 respectively. Based on detection data of these sensors 68, 69, an outboard motor controller properly adjusts A/F according to a driving state. As previously described, the exhaust pipe 27 extends upward from the vicinity of the center of the exhaust manifold 26, is bent in a direction perpendicular to the longitudinal direction (crankshaft) of the engine to be coupled to the exhaust hose 28. Consequently, the exhaust device 200 including the A/F sensor 68, the catalyst 64, the oxygen sensor 69, the front half portion where the exhaust flows up, the injection nozzle 62, and the rear half portion where the exhaust flows down is disposed and structured extremely compactly. Further, as a result, it is possible to dispose the catalyst 64 near the exhaust ports 48 of the engine, which prevents a temperature decrease of the catalyst 64 to improve purification efficiency. Incidentally, only one of the A/F sensor 68 and the oxygen sensor 69 may be used.

As described above, the seawater is supplied into the water jacket 58 of the exhaust pipe 27 to flow therein. Sacrifice metal 70 is placed at an appropriate place in the water jacket 58 as shown in FIG. 12A and FIG. 12B to prevent corrosion by salts in the seawater.

In a basic operation of the outboard motor 10 of the present invention, when the engine units 11 start to operate, their motive powers are first input to the speed reducers 32, and next are transmitted to the tie rods 34 from output ends of the speed reducers 32 via the universal joints 36. The engine motive powers are further transmitted from the tie rods 34 to the intermediate speed reducer 35. Though detailed illustration is omitted, in the intermediate speed reducer 35, the engine motive powers are transmitted from input shafts to the bevel gears, and to the drive shaft via the bevel gears, so that the drive shaft is driven to rotate. In the final, speed reducer in the gear case 41, a driving force of the drive shaft is transmitted to a bevel gear, further to a propeller shaft via the bevel gear, and to the propeller 42, so that the propeller 42 rotates.

During the operation of the engines, especially in the exhaust system 13, the exhaust gas generated in the engines is discharged from the exhaust devices 200. As previously described, the exhaust devices 200 each include the exhaust manifold 26, the exhaust pipe 27, the exhaust hose 28, the muffler 29, the exhaust hose 30, and so on, and the exhaust gas finally passes through the mufflers 29 to be discharged into the water from the exhaust exits 31.

Next, characterizing structures of the present invention, operations and effects thereof, and so on will be described. Firstly, the exhaust manifold 26 is connected to the exhaust ports 48 of the cylinder head 19 of the engine, and the water jacket 50 is attached so as to annularly cover the outer side of the exhaust channel in the exhaust manifold 26.

Attaching the water jacket 50 to the exhaust manifold 26 that becomes high by itself in temperature makes it possible to effectively cool also the exhaust manifold 26 and to prevent the engine room from being overheated by exhaust heat. Further, it is possible to use an inexpensive material for the exhaust manifold 26.

In this case, the water jacket 50 has the fill port 51 through which the cooling medium is fed from the lower end portion of the exhaust manifold 26 and the discharge port 52 through which the cooling medium is discharged from the upper end portion of the exhaust manifold 26. That is, the water jacket around the exhaust ports 48 of the cylinder head 19 of the engine and the water jacket 50 of the exhaust manifold 26 are not directly connected.

Since the water jacket 50 of the exhaust manifold 26 is not thus directly connected to the engine side, an engine not having a water-cooled exhaust manifold such as, for example, an automobile engine is usable as it is at low cost without changing the flow of its cooling medium. Further, the cooling system and so on of the engine can be designed independently of the cooling system of the exhaust manifold 26, and the cooling system of the exhaust manifold 26 can be set independently of the cooling system of the engine, which can enhance the degree of design freedom.

Further, as the cooling medium of the water jacket 50 of the exhaust manifold 26, the engine cooling coolant is made to flow.

Thus using the cooling medium common to that of the engine side makes it possible to form the cooling system at low cost. In this case, since the cooling medium for engine cooling contains a corrosion-resistant additive, the exhaust manifold 26 can be made of an inexpensive material. Further, the corrosion-resistant additive contained in the cooling medium for engine cooling eliminates a need to apply expensive surface treatment on a surface of the water jacket 50 of the exhaust manifold 26, which can practically realize a cost reduction.

Further, the exhaust open end of the exhaust manifold 26 is provided to face upward. That is, as the exhaust open end, the opening 49 facing upward is provided.

Since the exhaust manifold 26 is opened upward, it is possible to form the exhaust pipe 27 connected thereto in the siphon shape. Forming the exhaust pipe 26 in the siphon shape prevents moisture contained in the exhaust gas from flowing back to the exhaust ports 48 of the engine. That is, preventing the backflow of the moisture contained in the exhaust gas to the engine side enables the effective protection of the engine.

Further, the water jacket 58 is attached so as to annularly cover the outer side of the front half portion of the siphon shape of the exhaust pipe 27, and the seawater is directly supplied into the water jacket 58 to flow therein.

The temperature of the exhaust pipe 27 increases due to the flow of the exhaust gas therein, but attaching the water jacket 58 makes it possible to effectively cool also the exhaust pipe 27 and to prevent the engine room from being overheated by exhaust heat. Further, the exhaust pipe 27 can be made of an inexpensive material.

Further, in the exhaust pipe 27, the seawater is discharged from the injection nozzle 62 into the exhaust channel in the rear half portion of the siphon shape.

It is possible to feed water to the rear half portion (downflow portion) of the exhaust pipe 27 to form a wet exhaust. This can reduce an amount of the circulation cooling liquid used and also downsize the heat exchanger. In this case, the cost is low because a large amount of the seawater around the outboard motor 10 is usable, and in addition, an excessive amount of the cooling water can be discarded to the surroundings. By thus forming the exhaust pipe 27 in the siphon shape, cooling its front half portion by the water jacket 58, and cooling its rear half portion by the we exhaust, it is possible to highly efficiently cool the whole exhaust pipe 27.

Moreover, since a water jacket need not be provided around the wet exhaust formation portion, a light-weighted and compact exhaust system can be formed. Further, since there is no need to use an expensive heat-resistant material for the wet exhaust formation portion, an inexpensive material such as, for example, rubber, is usable. Further, since the temperature of the exhaust itself decreases, sound velocity lowers, resulting in a reduction in noise. Further, by using a flexible material such as rubber for the wet exhaust formation portion, it is possible to prevent abrasion and damage even if its outer part is touched slightly, and to reduce exhaust permeation sound.

Further, the seawater is once led out to the upper outside from the upper most portion of the water jacket 58 of the exhaust pipe 27 via the pipe 63, and the seawater is led into the injection nozzle 62 mounted on the exhaust channel of the exhaust pipe 27.

Thus forming the injection nozzle 62 for feeding the water as a separate body makes it possible to obtain the optimum feed pattern, that is, a spray state. Further, a maintenance work such as washing of a water nozzle portion can be facilitated. Further, since air near the top portion of the water jacket 58 of the exhaust pipe 27 can be let out, there occurs no air lock in the water jacket 58.

In this case, the injection nozzle 62 is mounted immediately after the top portion of the siphon shape and is directed in the downstream direction of the exhaust channel of the exhaust pipe 27.

When the injection nozzle 62 is thus disposed and structured, the density in itself is sufficiently high compared with the surrounding exhaust until the water evaporates. Consequently, the gravity matches a feed direction, so that the fed water does not flow back to the oxygen sensor 69, the A/F sensor 68, the catalyst 64, and the engine main body side which are on the exhaust upstream side. This can ensure high safety of the exhaust device 200.

Further, the oxygen sensor 69 or the A/F sensor 68 is disposed in the front half portion of the siphon shape of the exhaust pipe 27.

Since the oxygen sensor 69 or the A/F sensor 68 can detect the state of the exhaust gas, feedback control of the air-fuel ratio of the engine is possible. This enables the engine no operate with an optimum air-fuel ratio, improves fuel efficiency, and makes it possible to control an exhaust gas component. Further, the air-fuel ratio can be adjusted to a value suitable for the behavior of the catalyst 64. In this case, owing to the directivity of the injection nozzle 62, sensor portions of the oxygen sensor 69 and the A/F sensor 68 are not splashed with water, which makes it possible no prevent them from getting out of order.

In this case, the catalyst 64 is set between the oxygen sensor 69 or the A/F sensor 68 and the injection nozzle 62.

This prevents the catalyst 64 from being splashed with water and accordingly makes it possible to keep the temperature of the catalyst 64 high and makes it possible for the catalyst 64 to exhibit its proper function. Further, since the temperature around the exhaust channel is not increased while the temperature of the catalyst 64 is kept high, the engine room is not overheated.

Further, the sacrifice metal 70 is disposed in the water jacket 58 of the exhaust pipe 27.

Providing the sacrifice metal 70 allows the exhaust pipe 27 to be made of an inexpensive material. Further, there is an advantage that the water jacket 58 of the exhaust pipe 27 does not require expensive surface treatment.

Here, the exhaust device 200 of the outboard motor according to the present invention will be further described.

Figure 15:
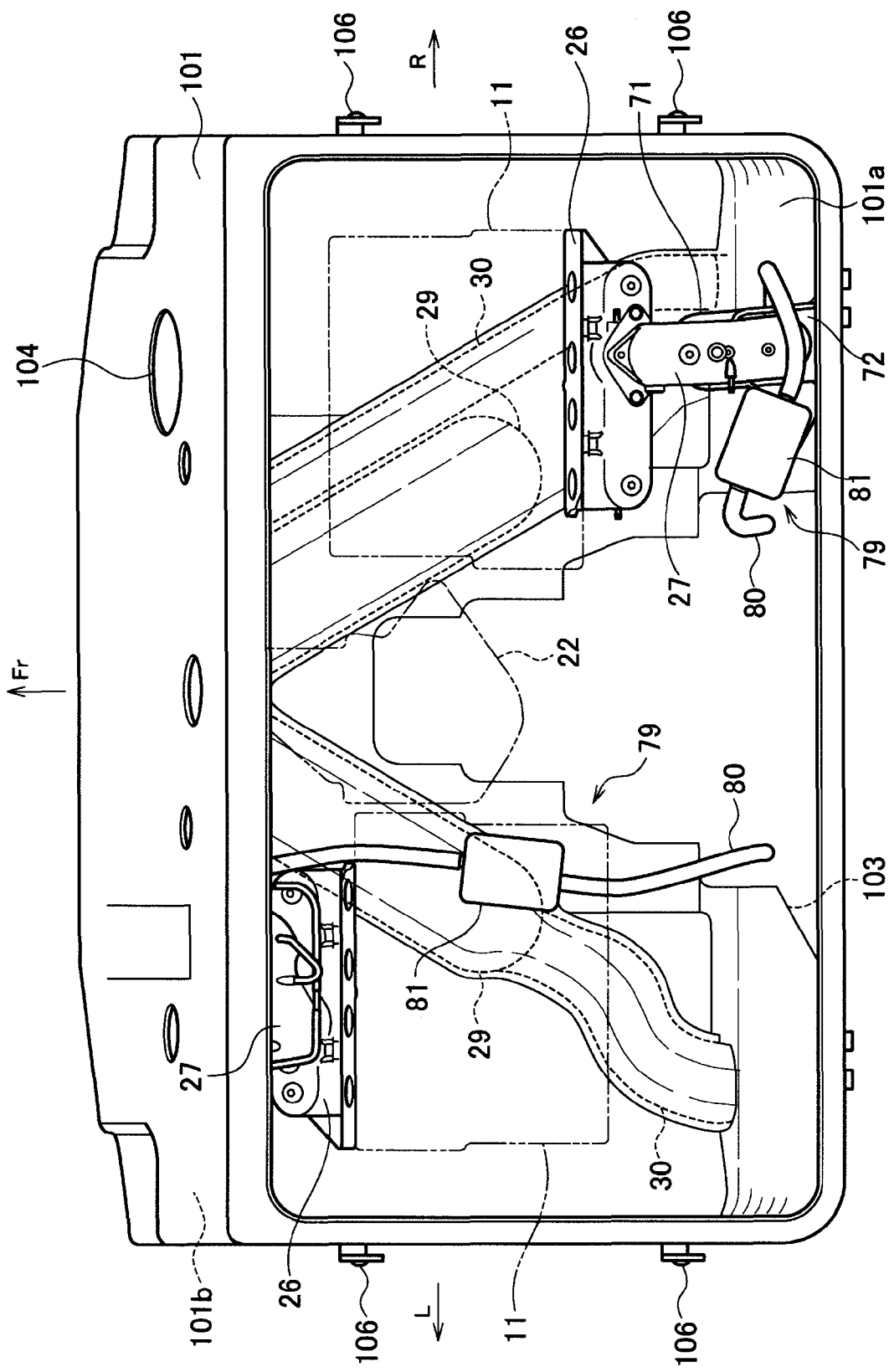
FIG. 15 is a top view showing an inner part of a case main body in the outboard motor of the present invention, with a case cover being removed.

Especially regarding the arrangement and structure of the exhaust hoses 28, cylindrical partition walls are provided in part of the engine case 100, and the exhaust hoses 28 extend to the mufflers 29 through the partition walls. In FIG. 15, this will be described, taking the right engine unit 11 as an example. FIG. 15 is a top view showing the inner part of the case main body 101, with the case cover 102 being removed. A cylindrical partition wall 71 is formed on a rear surface inner side 101a of the casing of the case main body 101 so as to extend in a substantially up and down direction. The partition wall 71 is formed to bulge toward the inside of the case main body 101, and its cylindrical inner part is a guide space 72 in a tunnel shape housing the exhaust hose 28. The guide space 72 is isolated from the inside of the case main body 101 by the partition wall 71, and in this case, side surfaces of the partition wall 71 are partly formed by the case main body 101 itself. That is, a rear side of the guide space 72 for the exhaust hose 28 is formed by the rear surface inner side 101a of the casing of the case main body 101. Accordingly, though the guide space 72 is in the tunnel shape or the cylindrical shape, its sectional shape is not circular but its rear side is flat. Likewise, as for the left engine unit 11, the exhaust hose 28 is connected to the exhaust manifold 26 joined with a is front side of the cylinder head 19, but in this case, a cylindrical partition wall extending in the substantially up and down direction is formed on a front surface inner side 101b of the casing of the case main body 101.

Figure 16A:
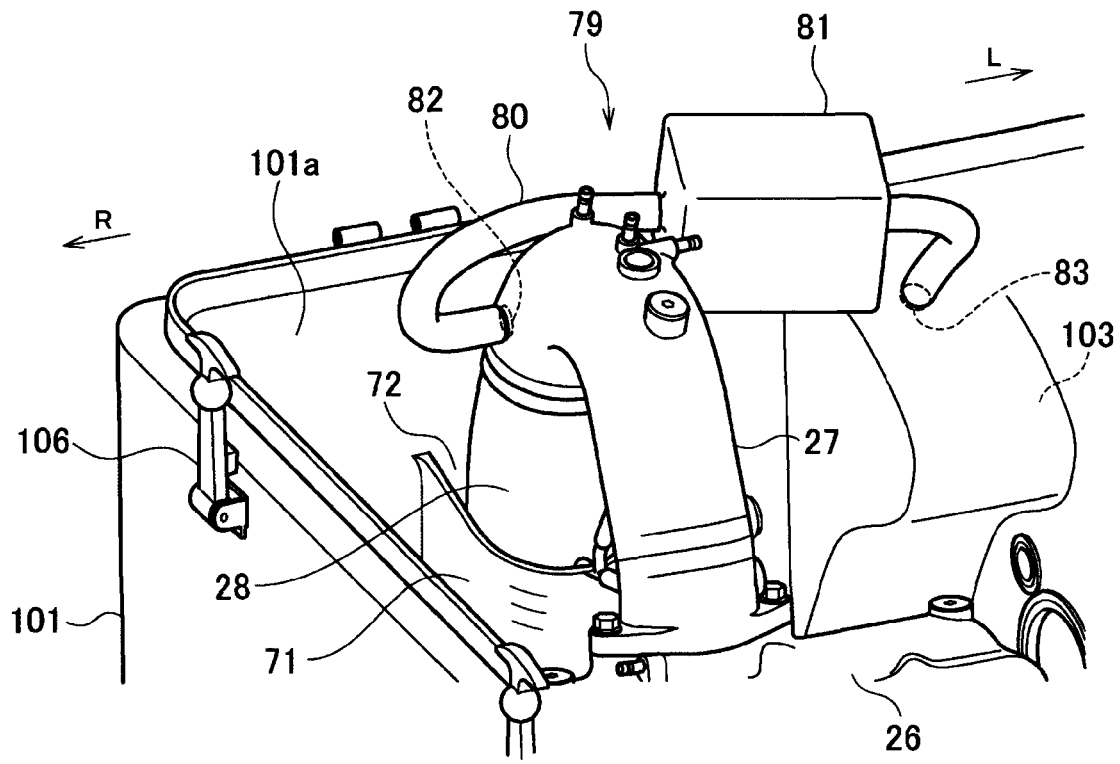
FIG. 16A is a perspective view showing the vicinity of an upper end of a partition wall provided in the engine case and the vicinity of an exhaust pipe in the outboard motor of the present invention.
Figure 16B:
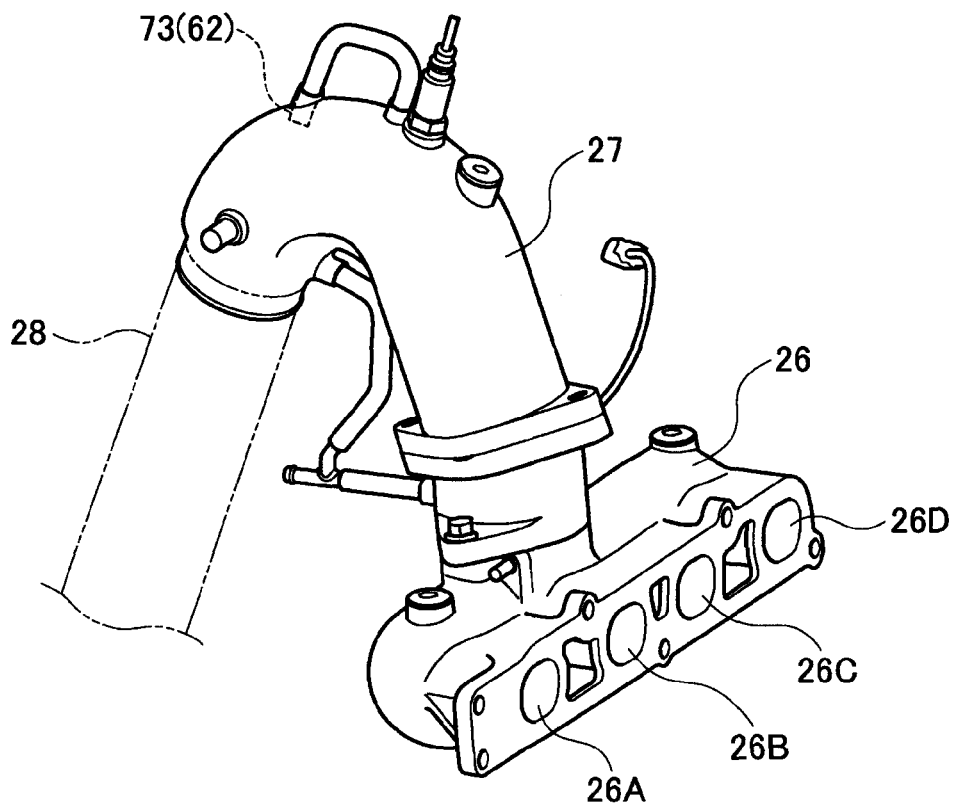
FIG. 16B is a perspective view showing the vicinity of the upper end of the partition wall provided in the engine case and the vicinity of the exhaust pipe in the outboard motor of the present invention.

As shown in FIG. 16A, an upper end of the partition wall 71 is set near an upper end of the case main body 101 of the engine case 100, and this upper end becomes an upper open end of the guide space 72. In FIG. 16A, only the upper end portion of the guide space 72 is shown, but the guide space 72 extends along the rear surface inner side 101a of the case main body 101 up to the bottom portion of the case main body 101. As shown in FIG. 16B, the exhaust pipe 27 is formed in the siphon shape, and an upper end of the exhaust hose 28 is coupled to an exhaust exit-side end portion of the siphon shape. The exhaust hose 28 passes in the guide space 72, and its lower end is coupled to the muffler 29 disposed in a later-described muffler chamber.

Further, as shown in FIG. 16B, an injection nozzle mounting portion 73 is provided more on an exhaust-channel downstream side than the top of the exhaust pipe 27, and here, the aforesaid injection nozzle 62 is mounted. From the injection nozzle 62, water, typically, seawater, is injected. In this embodiment, the water jacket for cooling formed to cover the periphery of the exhaust pipe 27 is attached, and the cooling water supplied to the water jacket is injected from the injection nozzle 62. Incidentally, a draw pump for the cooling water is mounted on the outboard motor 10, and the pumped-up cooling water is injected and discharged by the injection nozzle 62 to be directed in the downstream direction of the exhaust channel of the exhaust pipe 27. In this manner, the cooling water is discharged into the exhaust pipe 27, so that the exhaust hose 28 and the muffler 29 connected to its downstream side become a wet type.

Figure 17:
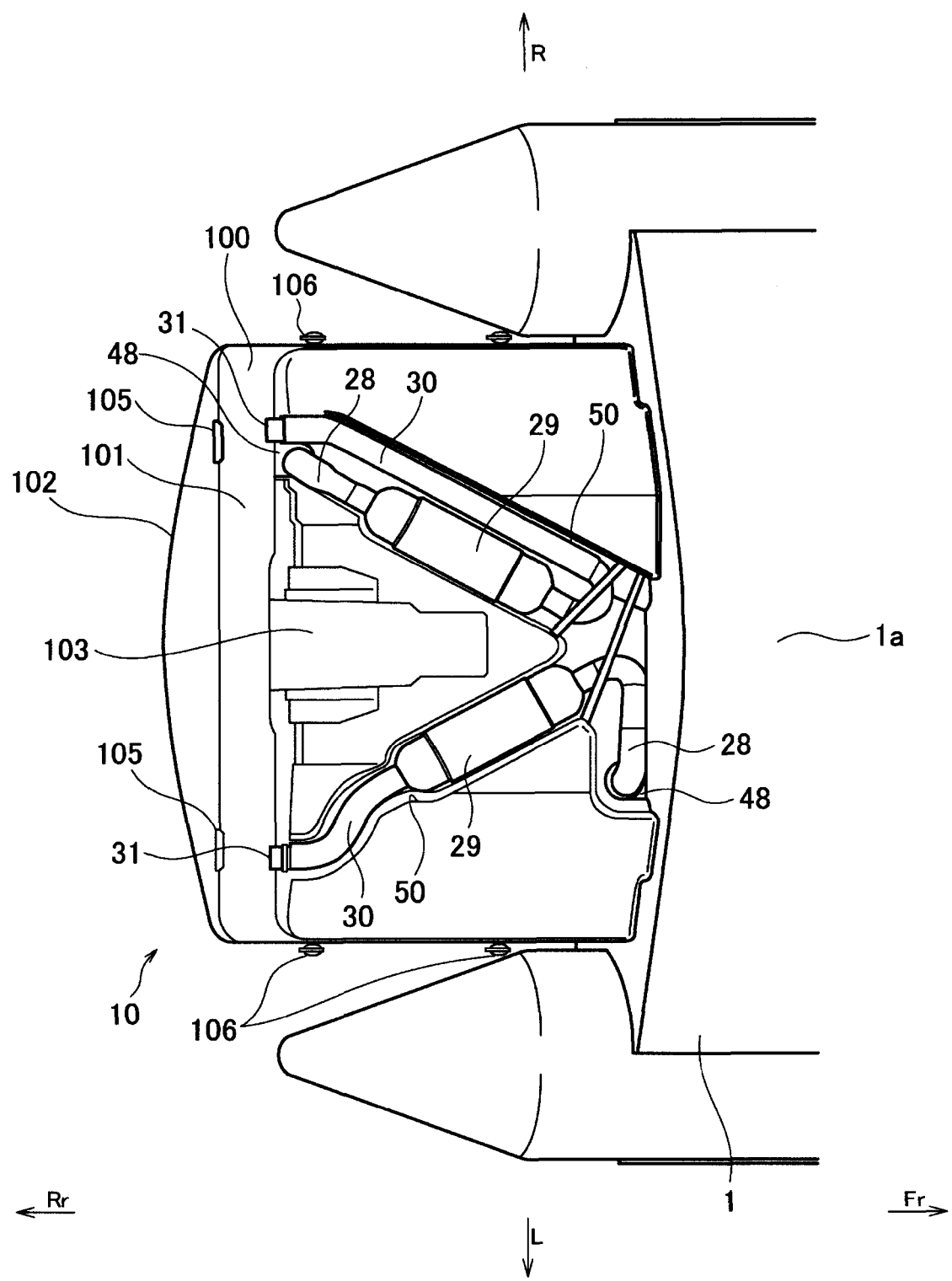
FIG. 17 is a bottom view of the engine case, with a muffler cover being removed, in the outboard motor of the present invention.

The mufflers 29 are installed on the lower surface of the case main body 101 and on the outer side. As shown in FIG. 17, the pair of mufflers 29 are disposed so as to form a substantially V-shape, in other words, so as to correspond to two equal sides of a substantially isosceles triangle, in a bottom view of the case main body 101. In this case, the muffler 29 connected to the right engine unit 11 and the muffler 29 connected to the left engine unit 11 are horizontally disposed so that an upstream side of the exhaust channel in the former is on a rear side and an upstream side of the exhaust channel in the latter is on a front side. A center portion of the lower surface of the case main body 101 on which these mufflers 29 are disposed is substantially flat, and left and right sides of this center portion are moderately inclined upward. The exhaust hose 30 connected to the right muffler 29 is disposed along a side of the muffler 29 and is connected to the exhaust exit 31 near the rear surface lower portion of the case main body 101.

The mufflers 29 and the exhaust hoses 30 are disposed so as not to project from the lower surface of the case main body 101. The muffler chambers 74 for housing the mufflers 29 and the exhaust hoses 30 are formed on the lower surface of the case main body 101 in order for them to be thus disposed. The muffler chambers 74 are indented from the lower surface outer side of the case main body 101 toward the inside of the case main body 101 and project to the inner side on the bottom surface of the case main body 101. The muffler chambers 74 form a substantially V-shape so as to correspond to the arrangement of the mufflers 29 and so on. As shown in FIG. 17, one mufflers 29 and the exhaust hoses 30 are housed and disposed so as to entirely fit in the muffler chambers 74. In this case, metal fittings (or brackets or the like) 75 (see FIG. 19B) press outer peripheral portions of the mufflers 29 with an appropriate force to accurately fix the mufflers 29 in the muffler chambers 74. Incidentally, the metal fittings 75 are fastened and fixed by bolts 76.

Figure 18A:
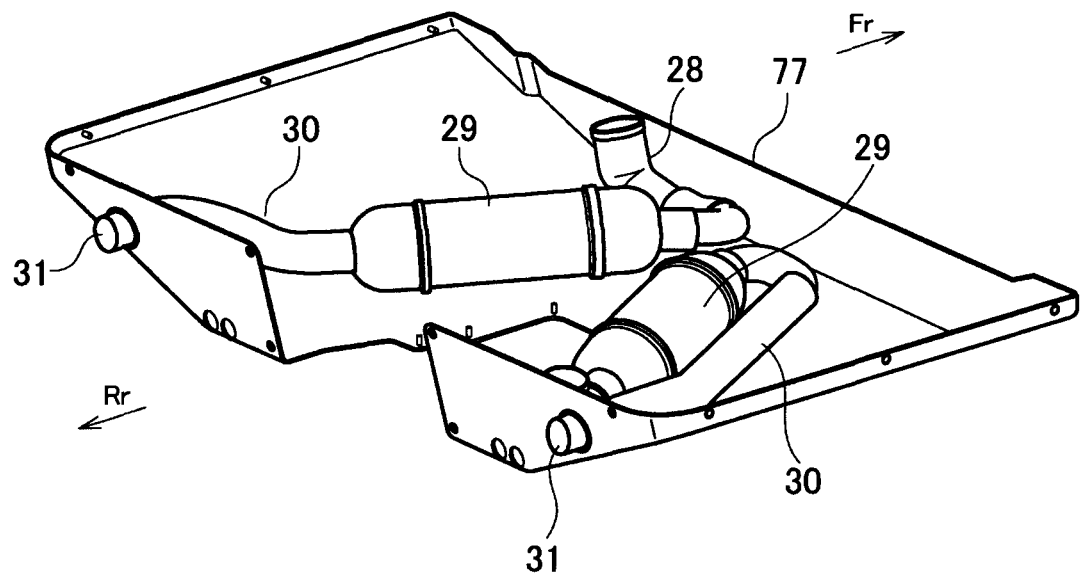
FIG. 18A is a perspective view showing a structure example of the muffler cover in the outboard motor of the present invention.
Figure 18B:
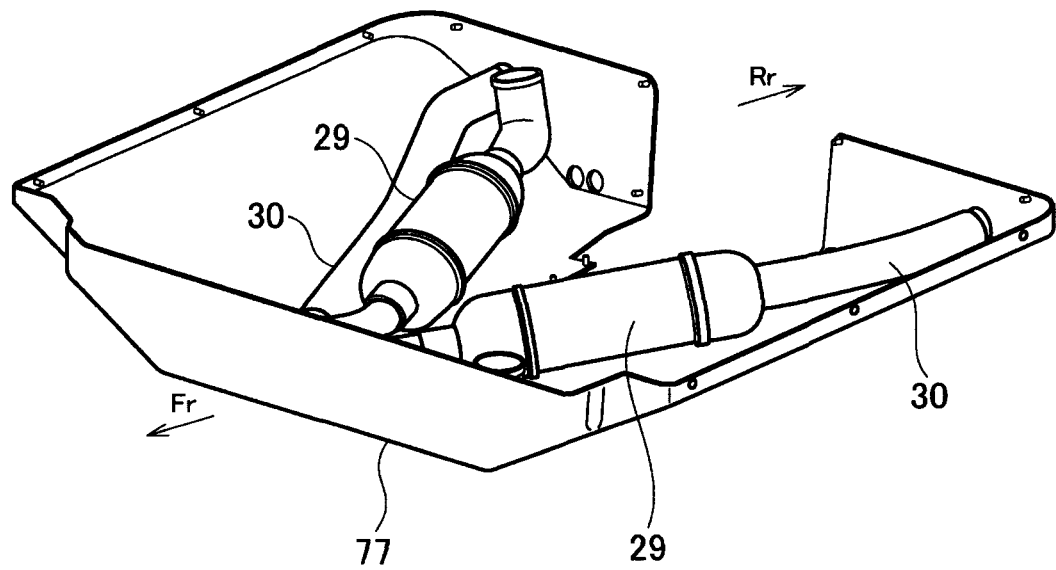
FIG. 18B is a perspective view showing the structure example of the muffler cover in the outboard motor of the present invention.

The mufflers 29 and so on disposed in the muffler chambers 74 as described above are covered by a muffler cover 77 as shown in FIG. 18A and FIG. 18B. The muffler cover 77 is hooked with a periphery of the bottom portion of the case main body 101 and in this state is fastened and fixed by bolts. The mufflers 29 are thus fixed while being sandwiched between the lower surface of the engine case 101 and the muffler cover 77. When the muffler cover 77 is put on the case main body 101, the lower surface of the engine case 100 becomes an extremely flat surface. In this manner, the mufflers 29 are fit in the indented muffler chambers 74 of the case main body 101 and are suspended by the metal fittings 75. Further, in this case, the muffler cover 77 does not bulge outward from the case main body 101 even at its portions located immediately under the mufflers 29, and the lower surface of the engine case 100 is very smoothed on the whole.

Figure 19A:
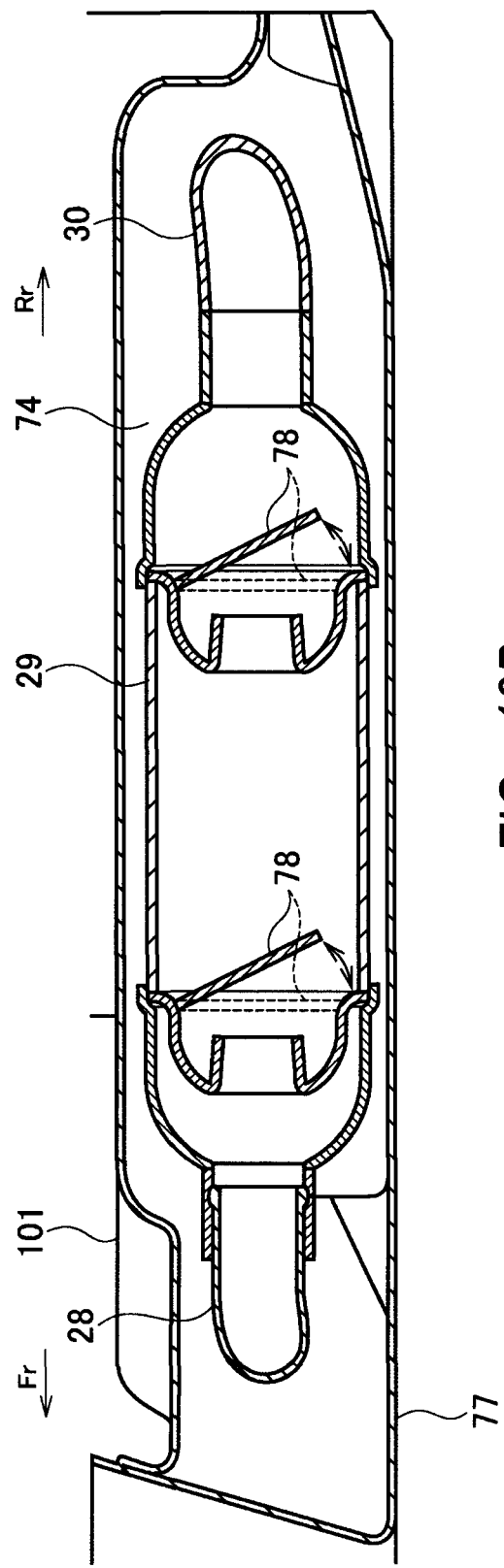
FIG. 19A is a cross-sectional view showing a structure example of the vicinity of the muffler cover in the outboard motor of the present invention.
Figure 19B:
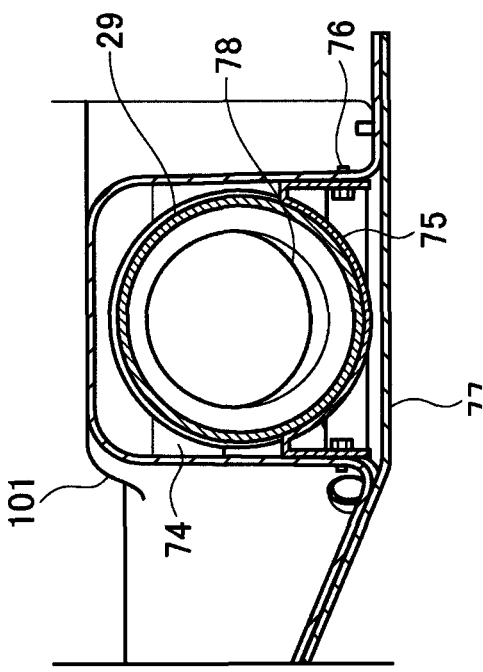
FIG. 19B is a cross-sectional view showing the structure example of the vicinity of the muffler cover in the outboard motor of the present invention.

FIG. 19A and FIG. 19B show the muffler 29 housed in the muffler chamber 74. As shown in FIG. 19A, in this example, check valves 78 are provided on an upstream side and a downstream side of the exhaust channel in the muffler 29. These check valves 73 open/close the exhaust channel in the muffler 29 by pivoting in both arrow directions as shown by the solid line and the dotted line. In this case, the check valves 78 can inhibit the backflow by being closed as shown by the dotted lines.

Further, a height position of the exhaust exit 31 being the open end of the muffler 29 is set higher than the ship bottom 1a of the hull 1 as shown in FIG. 4. At the same time, the height position of the exhaust exit 31 is set lower than the engine. As shown in FIG. 6 and so on, in the exhaust devices 200, the mufflers 29 and the exhaust hoses 30 connected thereto extend under the engine units 11, and the exhaust exits 31 attached to tips of the exhaust hoses 30 are projectingly disposed on the rear surface of the case main body 101. As previously described, the mufflers 29 including the exhaust hoses 30 are disposed substantially horizontally, and therefore, the exhaust exits 31 themselves are also disposed at positions lower than the engines.

Further, as shown in FIG. 2, FIG. 3, and so on, the exhaust exits 31 are disposed near the rear surface lower end of the case main body 101 so as to be apart from the left/right-direction center portion of the case main body 101. In the rear surface of the case main body 101, the indented portion 103 is provided, and the propulsion unit 15 is mounted on the indented portion 103. The exhaust exits 31 are disposed to deviate toward the beam-direction outer sides of the case main body 101, that is, are apart from the indented portion 103.

Further, in this embodiment, when the rotation speeds of the engines of the engine units 11 are low and their exhaust pressures are low, the exhaust is performed via exhaust release systems. This will be also described, taking the right engine unit 11 as an example. As shown in FIGS. 16A, 16B and FIGS. 20A to 20C, there is provided an exhaust release system 79 including a release pipe 80 connected to a predetermined place of the exhaust pipe 27 and an expansion chamber 81 connected and disposed in the middle of the release pipe 80.

Figure 20A:
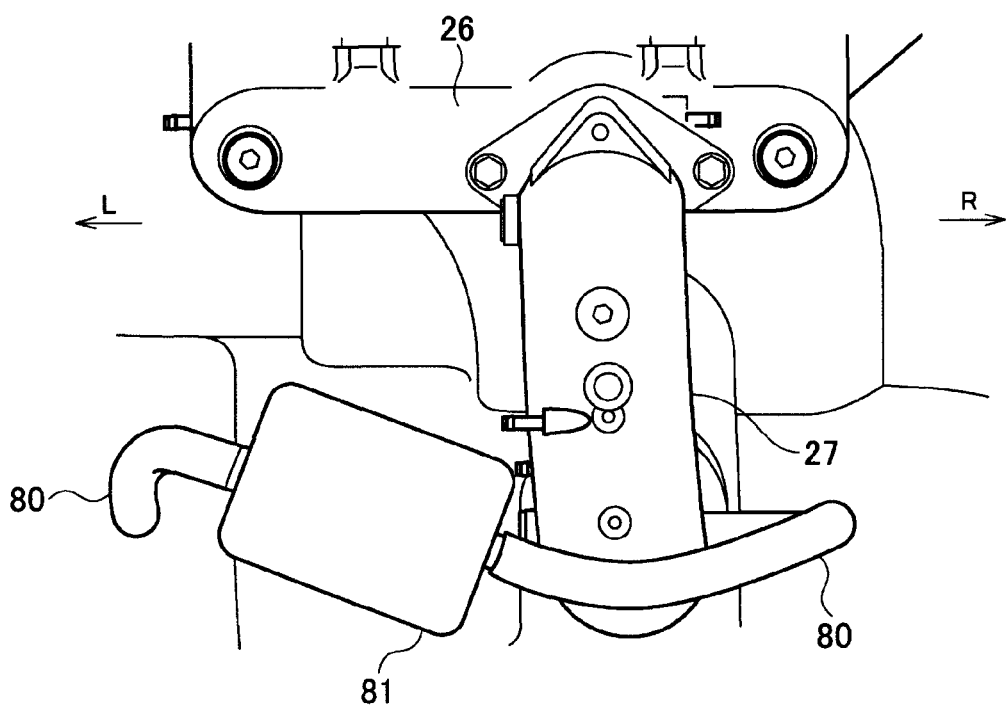
FIG. 20A is a top view showing an exhaust release system according to the outboard motor of the present invention.
Figure 20B:
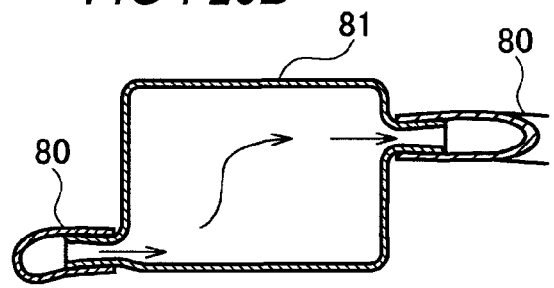
FIG. 20B is a cross-sectional view of an expansion chamber in the exhaust release system according to the outboard motor of the present invention.
Figure 20C:
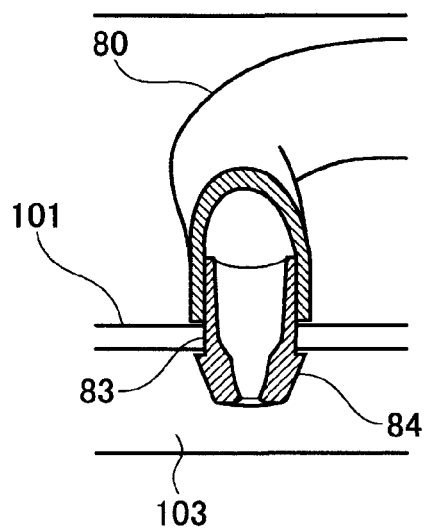
FIG. 20C is a partial sectional view of an exhaust release port in the exhaust release system according to the outboard motor of the present invention.

Concretely, an exhaust takeout port 82 of the exhaust release system 79 is provided in the rear half portion of the exhaust pipe 27, and one end of the release pipe 80 is connected to the exhaust takeout port 82. Further, the other end of the release pipe 80 is an open end of the exhaust release system 79 and is connected to an exhaust release port 83 formed in an upper surface or a ceiling surface of the indented portion 103 of the case main body 101. The exhaust is released downward from the upper surface of the indented portion 103 via the exhaust release port 83. The expansion chamber 81 may be in a box shape or the like as shown in FIG. 16A and so on, but is formed so that the exhaust gas enters from its lower portion and exits from its upper portion as shown in FIG. 20B. Incidentally, a release nozzle 84 is mounted on the exhaust release port 83 as shown in FIG. 20C and the release pipe 80 is connected to the release nozzle 84.

As previously described, particularly as for the exhaust gas, during the operation of the engine, water is fed into the exhaust channel in the exhaust pipe 27, so that a so-called wet exhaust is formed, which can lower the temperature of the exhaust gas. The exhaust gas thus having a lowered temperature flows from the exhaust pipe 27 to the exhaust hose 28 and passes through the guide space 72 of the case main body 101 to be carried to the exhaust exit 31 through the exhaust hose 30 connected to the muffler 29 in the muffler chamber 74.

As shown in FIG. 3, the exhaust exits 31 being main exhaust ports are at positions higher than a gliding-time draft line $L_2$ and are at positions lower than a halt-time (nongliding-time) draft line $L_1$. From the exhaust exits 31 thus disposed, the exhaust is discharged only during the gliding time when the engines are operated at a high speed. Therefore, no sound of the fed wetting water beaten by the exhaust Pulsation during the low-speed operation is generated. Since the exhaust hoses 28 and the mufflers 29 are of the wet type and have lowered temperatures, rubber which is light-weighted and excellent in damping property is usable instead of metal as their material. In this case, since they do not suffer bending deformation in accordance with steering and tilting of the propulsion unit, unlike bellows of an inboard-outdrive motor of a wet underwater exhaust type, these exhaust hoses 28 and mufflers 29 have excellent durability and reliability.

Further, the exhaust exits 31 being the open ends of the mufflers 29 are located at the back under the water during the low-speed period (non-gliding time), and accordingly receive a positive pressure in addition to a water depth pressure during reverse drive. In order to prevent the backflow of water in this case, the check valves 78 of a flap type are provided in the mufflers 29.

Further, in the exhaust downflow portions (wet portions) of the exhaust pipes 27, escape ports for the exhaust gas (exhaust takeout ports 82 of the exhaust release systems 79) are provided for the left and right engines respectively. In the exhaust release systems 79, the exhaust gas is discharged from the ceiling surface of the indented portion 103 of the case main body 101 via the exhaust release ports 83 so the outside of the outboard motor 10. Since the not-shown catalysts are put in the exhaust upflow portions of the exhaust pipes 27 (the front half portions of the siphon shapes), the exhaust gas from the exhaust release systems 79 is also cleaned.

Further, since the exhaust release ports 83 of the exhaust release systems 79 are located sufficiently higher than the halt-time draft line $L_1$, the exhaust pressure increases during the halt time and reverse drive, which makes it possible to perform stable exhaust even when the check valves 78 of the mufflers 29 are closed and to maintain low-speed driving performance of the engines in a favorable state. In the middle of the release pipes 80, typically at the center portions, the expansion chambers 81 are provided, which smoothes the pulsation of the exhaust gas to reduce exhaust sound. Further, the exit open ends of the expansion chambers 81 are quiet nozzles (in a funnel shape) continuing to the release pipes 80, and the exhaust sound from the exhaust release systems 79 is effectively reduced. Further, since entrance portions of the expansion chambers 81 are near bottom surfaces of the expansion chambers 81, water mixed in the exhaust gas flows back to the mufflers 29 from the exhaust takeout ports 82 of the exhaust pipes 27 so be discharged when the engines stop.

Next, characterizing structures of the present invention, operation and effects thereof, and so on of the present invention will be described. Firstly, the cylindrical partition walls 71 are provided in part of the case main body 101, the exhaust pipes 27 and the mufflers 29 are coupled via the exhaust hoses 28 housed in the guide spaces 72 isolated from the inside of the case main body 101 by the partition walls 71.

The muffler chambers 74 themselves are formed on the outer side of the case main body 101, but water around the mufflers 29 disposed in the muffler chambers 74 cannot enter the inside of the engine case 100 unless it crosses over the upper ends of the partition walls 71. Therefore, there is no concern that a water-exposure environment of the engine case 100 might be impaired. Further, during the operation of the engines of the engine units 11, there occur their own vibration and oscillation generated by driving and a reactive force from the propulsion system. On the other hand, the mufflers 29 are fixed to the engine case 100 by the muffler cover 77 and the exhaust hoses 28 are made of rubber, which makes it difficult for the vibration and oscillation of the engines to be transmitted to the mufflers 29. Further, since the guide spaces 72 formed by the partition walls 71 are wider than the exhaust hoses 28, the exhaust hoses 28 do not come into contact with the partition walls 71 when the engines oscillate. For these reasons, is possible to effectively protect the mufflers 29.

Further, the exhaust pipes 27 are coupled to the upper ends of the exhaust hoses 28 and are installed at positions sufficiently higher than the mufflers 29. Therefore, the seawater or the water fed into the exhaust gas from the injection nozzles 62 does not flow back from the exhaust exits 31 being the exhaust open ends to the engines via the exhaust pipes 27. Further, hoses for discarding excessive seawater or the like can pass in the partition walls 71.

Further, the side surfaces of the partition walls 71 are partly formed by the case main body 101 of the engine case 100. Thus providing the partition walls 71 in the engine case 100 makes it possible to practically improve design without influencing the exterior appearance of the engine case 100.

Further, water is injected into the exhaust pipes 27 from the injection nozzles 62 provided more downstream than the tops of the exhaust pipes 27, whereby the exhaust hoses 28 and the mufflers 29 become a wet type.

When the mufflers 29 thus become the wet type, the peripheries of the mufflers 29 are not overheated. This allows the omission of the cooling water jacket, enabling the devices to be light-weighted and compact. Further, preventing the overheating eliminates a need for using an expensive heat-resistant material, and for instance, rubber or the like can be used as their material, which can practically reduce cost of the devices. Moreover, since the temperature of the exhaust gas itself lowers, sound velocity lowers and noise can be reduced, and gaps between the mufflers 29 and their surroundings can be made small, resulting in the compact devices.

In particular, the exhaust hoses 28 and the mufflers 29 are made of rubber, and thus using a flexible material such as rubber makes it possible to prevent abrasion and damage even when they slightly come into contact with outer parts. Further, using the flexible material such as rubber makes it possible to reduce exhaust permeation sound and prevent the corrosion of the mufflers 29. Further, the mufflers 29 can be used in an environment exposed to seawater.

Further, the height of the exhaust exits 31 being the open ends of the mufflers 29 are set higher than the ship bottom 1a (see FIG. 4 and FIG. 17) and lower than the engines.

Since the exhaust exits 31 are located higher than the ship bottom 1a, exhaust system components including the exhaust exits 31 do not become fluid resistances during the driving. Further, since the exhaust exits 31 are located lower than the engines, the seawater does not flow back from the exhaust open ends to the engines.

Since the exhaust exits 31 are higher than the water surface during the gliding time when a ship speed is high, the exhaust system components do not become fluid resistances. On the other hand, during the non-gliding time when the ship speed is low, since the engine speed is low, the exhaust itself is little.

Further, since the check valves 78 are disposed in the mufflers 29, the seawater does not flow back to the exhaust system. In particular, during the reverse drive, the valves are not opened unless the exhaust pressure becomes equal to or more than an valve opening pressure, and therefore, the seawater does not flow back.

Further, the mufflers 29 are disposed horizontally, are housed in the muffler chambers 74 formed along the shape of the mufflers 29, and are fixed by being sandwiched by the lower surface of the case main body 101 and the muffler cover 77.

Since the muffler cover 77 is put on the lower surface of the case main body 101 and the bottom surface of the muffler cover 77 has no irregularities, fluid resistance is small. Further, since the mufflers 29 are entirely fit in the indented muffler chambers 74, a volume of space around the mufflers 29 can be made small, and the seawater entering around the mufflers 29 during the non-gliding time can be discharged in a short time during the gliding time.

Since the mufflers 29 are horizontally disposed, it is possible to prevent the water from being left in the mufflers 29 when it is not used, which has a merit of being advantageous in terms of maintenance. Further, since the mufflers 29 are disposed lower than the engines, it is possible to dispose the engines at positions high from the draft line, and the engines are not splashed with water. Further, it is possible to make the center of gravity lower than when the mufflers are disposed at positions higher than the engines located at positions high from the draft line, resulting in excellent driving stability.

Further, the muffler cover 77 (lower cover) can be supported by a wall surface along the case indented portion, a water force which is applied to the muffler cover 77 during driving can be distributed and transmitted to the engine case 100 and the engine frame. Therefore, it is possible to form the high-rigidity case lower cover with a light weight. Further, since the muffler cover 77 can be supported by the wall surface along the case indented portion, it is possible to distribute and transmit the own weight to the engine case 100 and the engine frame even when the outboard motor is temporarily placed on a floor in such a case where it is temporarily not mounted on the boat during conveyance or maintenance. Therefore, it is possible to form the high-rigidity case lower cover with a light weight.

Further, the exhaust exits 31 being the open ends of the mufflers 29 are disposed near the rear surface lower end of the engine case 100 so as to be apart from its center portion.

When the exhaust exits 31 are thus disposed, the engine case 100 itself serves as a shielding against exhaust sound, which can make it difficult for the exhaust sound to reach passengers. Further, since the exhaust exits 31 are apart from the center portion of the engine case 100, the exhaust is not involved in the propeller during the reverse drive as it does in a conventional-type outboard motor, and propeller performance is not worsened.

Further, when the engine speeds of the engine units 11 are low and their exhaust pressures are low, the exhaust takes place via the exhaust release systems 79.

When the engine speed is low, the boat is not gliding and thus the open ends of the mufflers 29 are under the water surface. When the engine speed is of the exhaust pressure increases and in this state, the engines do not smoothly operate. Providing the exhaust release systems 79 as separate systems and discharging the exhaust gas from the exhaust release systems 79 into the air enables the stable and smooth operation of the engines since the exhaust pressure lowers.

In this case, since the exhaust is taken out from places where the exhaust temperature is low, that is, from the exhaust takeout ports 82 of the rear half portions of the exhaust pipes 27, a material not having special heat resistance such as rubber is usable for exhaust release routes. Further, purified exhaust after passing the catalysts can be discharged. Moreover, the use of a highly flexible material such as a rubber hose enables the piping in a narrow place, so that the whole structure becomes compact.

Further, the open ends of the exhaust release systems 79, that is, the exhaust release ports 83 are provided so as to extend downward from the upper surface of the center indented portion 103 of the engine case 100.

In a conventional-type large outboard motor, when it is attached via a bracket from a boat, an exhaust release is sometimes performed under the water surface. On the other hand, in the present invention, since the exhaust discharged from the exhaust release systems 79 can be at a position higher than the water surface, the open ends of the exhaust release systems 79 do not become under the water surface, to whatever type of boat a transverse engine outboard motor is attached. Therefore, predetermined performance can be constantly generated. Further, since the open ends of the exhaust release systems 79 are provided in the indented portion 103 of the engine case 100, even when the engine case 100 gets dirty due to the exhaust gas, the dirty portion is not a directly visible portion, and a design surface does not get dirty. Moreover, since the open ends do not become under the water surface even during the reverse drive, the exhaust pressure can be kept low. In this case as well, the engine case 100 itself serves as a shielding, so that exhaust release sound does not easily reach passengers.

In the foregoing, the present invention has been described with various embodiments, but the present invention is not limited only to these embodiments and changes and so on can be made within the scope of the present invention.

In the above embodiments, the example where the exhaust pipe 27 is joined with the exhaust manifold 26 via the intermediate pipe 59 is described, but the exhaust pipe 27 can be joined directly with the exhaust manifold 26.

Further, in the above embodiment, the example where the exhaust hose 28 and the muffler 29 are made of rubber is described, but they may be made of synthetic resin provided that it has heat resistance and predetermined strength.

According to the present invention, since the water jacket is attached to the exhaust manifold, effectively cooling the water jacket makes it possible to prevent the engine room from being overheated by exhaust heat, and to make the exhaust manifold and so on of an inexpensive material. In this case, since the water jacket of the exhaust manifold is not directly connected to the engine side, an automobile engine or the like can be applied as it is inexpensively, which is extremely cost-advantageous.

Further, by making the engine cooling coolant flow as the cooling medium of the water jacket of the exhaust manifold, it is possible to form the cooling system at low cost.

Further, the exhaust pipe in the siphon shape is connected to the exhaust open end, of the exhaust manifold, which faces upward, the water jacket is attached to annularly cover the outer side of the front half portion of the siphon shape, and the seawater is directly supplied to flow. Consequently, it is possible to effectively cool the exhaust pipe without moisture contained in exhaust gas being flowing back to the engine side.

Further, according to the present invention, the water around the muffler in the muffler chamber formed on the outer side of the case main body cannot enter the inside of the engine case unless it crosses over the upper end of the partition wall, which makes it possible to maintain safe water-exposure environment of the engine case. Further, by maintaining cooling ability for the exhaust hose and the muffler and a proper connection and arrangement relation with surrounding members and by making them of typically rubber, it is possible to realize effects such as weight reduction and cost reduction.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An exhaust device of an outboard motor to discharge combustion gas from an engine of an outboard motor which includes the engine housed in an engine case and provided with a cylinder, a cylinder head and an exhaust manifold, each being a water cooled type, and a propulsion unit disposed on an outer portion of the engine case and driven by the engine, the exhaust device comprising:
   an exhaust pipe;
   a water jacket formed on the exhaust pipe to annularly cover an outer side of a front half portion of the exhaust pipe connected to a downstream end of the exhaust manifold,
   a first cooling medium supplied to the water jacket and is exhausted to an outside through a cooling system via an injection nozzle provided on an exhaust channel of a rear half portion of the exhaust pipe;
   a heat exchanger connected to other water jackets of the cylinder, the cylinder head and the exhaust manifold;
   a second cooling medium circulates in an inner part of the other water jackets of the cylinder, the cylinder head and the exhaust manifold, and the heat exchanger, through cooling system circulation channels;
   a muffler;
   an exhaust hose;
   a cylindrical partition wall, extending in up and down on an inner part of the engine case; an upper end of the partition wall is opened near an upper end of the engine case;
   a lower end of the partition wall is formed outside of a lower surface of the engine case and is opened to a muffler chamber housing the muffler and the exhaust hose to communicate with the inner part of the engine case and the muffler chamber; and
   an upper end of the exhaust hose is coupled to an exit of the exhaust pipe and a lower end of the exhaust hose is coupled to the muffler;
   wherein the exhaust hose is laid from the inner part of the engine case to the muffler chamber through the cylindrical partition wall;
   wherein the first cooling medium is at least one of seawater or fresh water;
   wherein the cooling system is independent from the cooling system circulation channels;
   wherein the exhaust pipe, having the front half portion in which a downstream side is directed upward along a flowing direction of exhaust and the rear half portion in which a downstream side is directed downward along the flowing direction of the exhaust, is formed in a siphon shape where middle portions of the front half portion and the rear half portion are highly curving in comparison to other portions of the exhaust pipe;
   wherein the first cooling medium is injected toward a downstream side of the flowing direction of the exhaust inside the exhaust pipe from the injection nozzle disposed on the rear half portion downstream of a to of the exhaust pipe, wherein this configuration makes the exhaust hose and the muffler a wet type, and
   wherein the exhaust hose and the muffler are made of rubber.

2. The exhaust device of the outboard motor according to claim 1, further comprising either an oxygen sensor or an air-fuel ratio sensor disposed in the front half portion in which the downstream side is directed upward along the flowing direction of the exhaust in the exhaust pipe formed in the siphon shape.

3. The exhaust device of the outboard motor according to claim 1, further comprising a sacrifice metal disposed in the water jacket of the exhaust pipe into which the first cooling medium is supplied and flows.

4. The exhaust device of the outboard motor according to claim 2, further comprising a catalyst disposed on the front half portion of the exhaust pipe and between either the oxygen sensor or the air-fuel ratio sensor, and the injection nozzle.

5. The exhaust device of the outboard motor according to claim 1, further comprising side surfaces of the partition wall partly formed by the engine case.

6. The exhaust device of the outboard motor according to claim 1, wherein the muffler is horizontally disposed along the lower surface of the engine case, the lower surface of the engine case is formed in an indented shape along a shape of the muffler, the muffler is housed in the indented portion, and further comprising:
   a muffler cover forming the muffler chamber by covering the muffler chamber from a lower side; and
   wherein the muffler is sandwiched between the lower surface of the engine case and the muffler cover so as to be fixed.

* * * * *